(12) United States Patent
Matsuo

(10) Patent No.: US 8,317,093 B2
(45) Date of Patent: Nov. 27, 2012

(54) INFORMATION PROVIDING SYSTEM, APPARATUS AND METHOD FOR INFORMATION PROCESSING, AND COMPUTER PROGRAM PRODUCT

(75) Inventor: Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 12/261,639

(22) Filed: Oct. 30, 2008

(65) Prior Publication Data

US 2009/0108062 A1 Apr. 30, 2009

(30) Foreign Application Priority Data

Oct. 30, 2007 (JP) .................................. 2007-282072
Jul. 30, 2008 (JP) .................................. 2008-195704

(51) Int. Cl.
*G06K 7/00* (2006.01)
(52) U.S. Cl. .......................... 235/380; 235/487; 235/492
(58) Field of Classification Search .................. 235/380, 235/451, 375, 487, 492
See application file for complete search history.

(56) References Cited

U.S. PATENT DOCUMENTS

| | | | | |
|---|---|---|---|---|
| 2002/0169714 A1* | 11/2002 | Ike et al. | ........................... | 705/39 |
| 2004/0012620 A1* | 1/2004 | Buhler et al. | .................. | 345/716 |
| 2005/0272371 A1* | 12/2005 | Komatsuzaki et al. | ....... | 455/41.2 |
| 2006/0192005 A1* | 8/2006 | Narui et al. | .................... | 235/439 |
| 2007/0117623 A1* | 5/2007 | Nelson et al. | ................... | 463/29 |

FOREIGN PATENT DOCUMENTS

| | | |
|---|---|---|
| JP | 2001-312671 | 11/2001 |
| JP | 2003-233754 A | 8/2003 |
| JP | 2004-78591 | 3/2004 |
| JP | 2004-78591 A | 3/2004 |
| JP | 2006-120062 A | 5/2006 |
| JP | 2006-202229 | 8/2006 |

OTHER PUBLICATIONS

Takashi Sakamura, "Digital Archives, From Digital Museum to Ubiquitous Museum, Artificial Intelligence Official Journal of a Scientific Society", The Japanese Society for Artificial Intelligence, vol. 18, No. 3, May 1, 2003, pp. 259-266 (with one additional page).

(Continued)

*Primary Examiner* — Michael G Lee
*Assistant Examiner* — Matthew Mikels
(74) *Attorney, Agent, or Firm* — Oblon, Spivak, McClelland, Maier & Neustadt, L.L.P.

(57) ABSTRACT

An information providing system includes the following elements. An IC card stores card ID. An information providing terminal reads out the card ID of the IC card, provides information to the IC card, and transmits the card ID and the information provided to the IC card or the ID of the provided information to a management server. The management server receives the card ID and the information provided to the IC card or the provided information ID from the information providing terminal, has a database to manage the card ID and the provided information such that the card ID is associated with the provided information, acquires the information provided to the IC card from the database in response to an information request from a client terminal, and supplies the provided information to the client terminal. The client terminal displays the provided information supplied from the management server.

2 Claims, 15 Drawing Sheets

OTHER PUBLICATIONS

Nobuyuki Yoneta, et al., "Trial Manufacturing of RFID/GIS Associated Server and an Application Study to Environmental Information UD, Information Processing Society of Japan Memoir", Information Processing Society of Japan, vol. 2006, No. 27, Mar. 17, 2006, pp. 93-100 (with one additional page).

Japanese Office Action issued Sep. 6, 2011, in Patent Application No. 2008-195704.

Japanese Office Action mailed on Feb. 21, 2012, issued for JP Application No. 2008-195704, filed on Jul. 30, 2008 (with English translation).

Sakamura, Ken. "From Digital Museum to Ubiquitous Museum." Journal of Artificial Intelligence Society, Japanese Society for Artificial Intelligence, May 1, 2003. vol. 18, No. 3. p. 259-266.

* cited by examiner

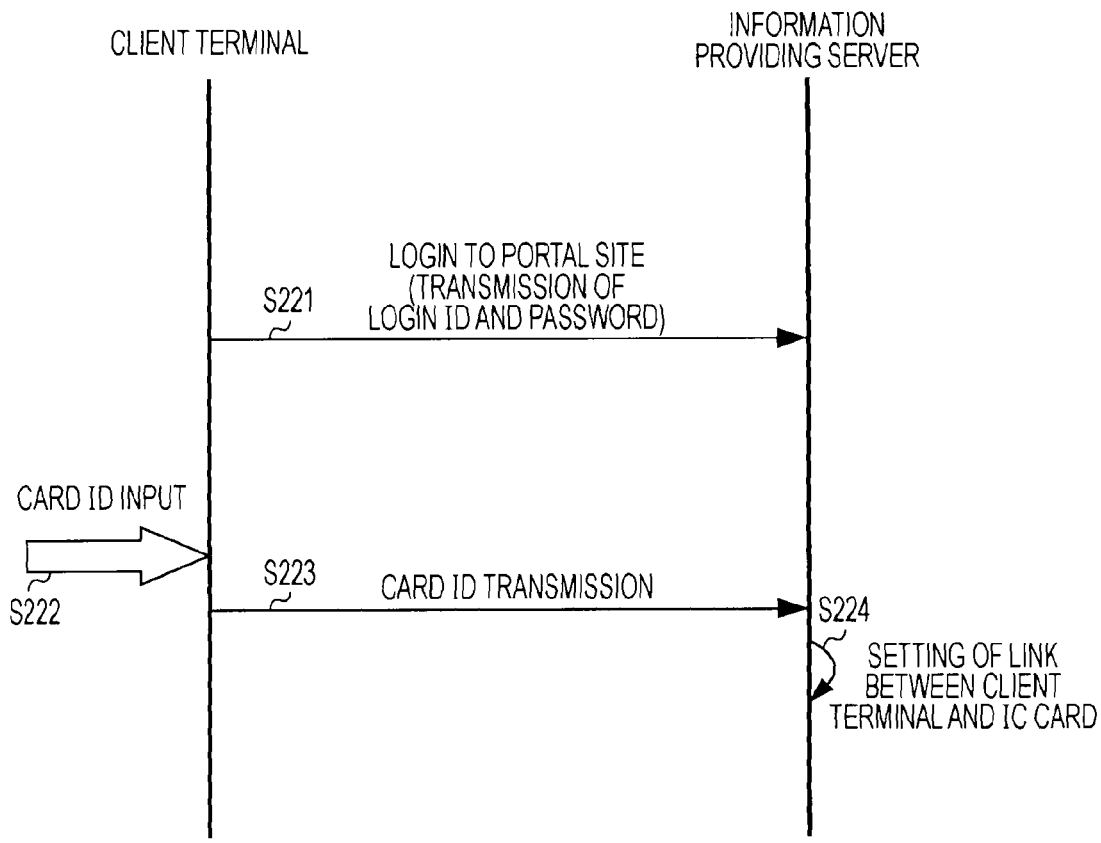

FIG. 14

(A) EXAMPLE OF INFORMATION FROM WEB INFORMATION PROVIDING SERVER

```
<html>
<head><title>Your Portal site</title></head>
<body>
 ..
FOLLOWING INFORMATION IS DATA YOU ACQUIRED BY TOUCHING INFORMATION
PROVIDING TERMINAL WITH CARD
<embed URL="www.kanri-server.jp" CardID="1234567890">
 ..
</body>
</html>
```

INFORMATION FROM MANAGEMENT SERVER IS EMBEDDED IN THAT PORTION (B) EXAMPLE OF INFORMATION FROM MANAGEMENT SERVER

```
<title> ACQUIRED DATA NAME 1 </title>
<link>http://www.kanri-server.jp/card_content_info</link>
<description>ACQUIRED CONTENT INFORMATION 1</descriptoin>
 ..
```

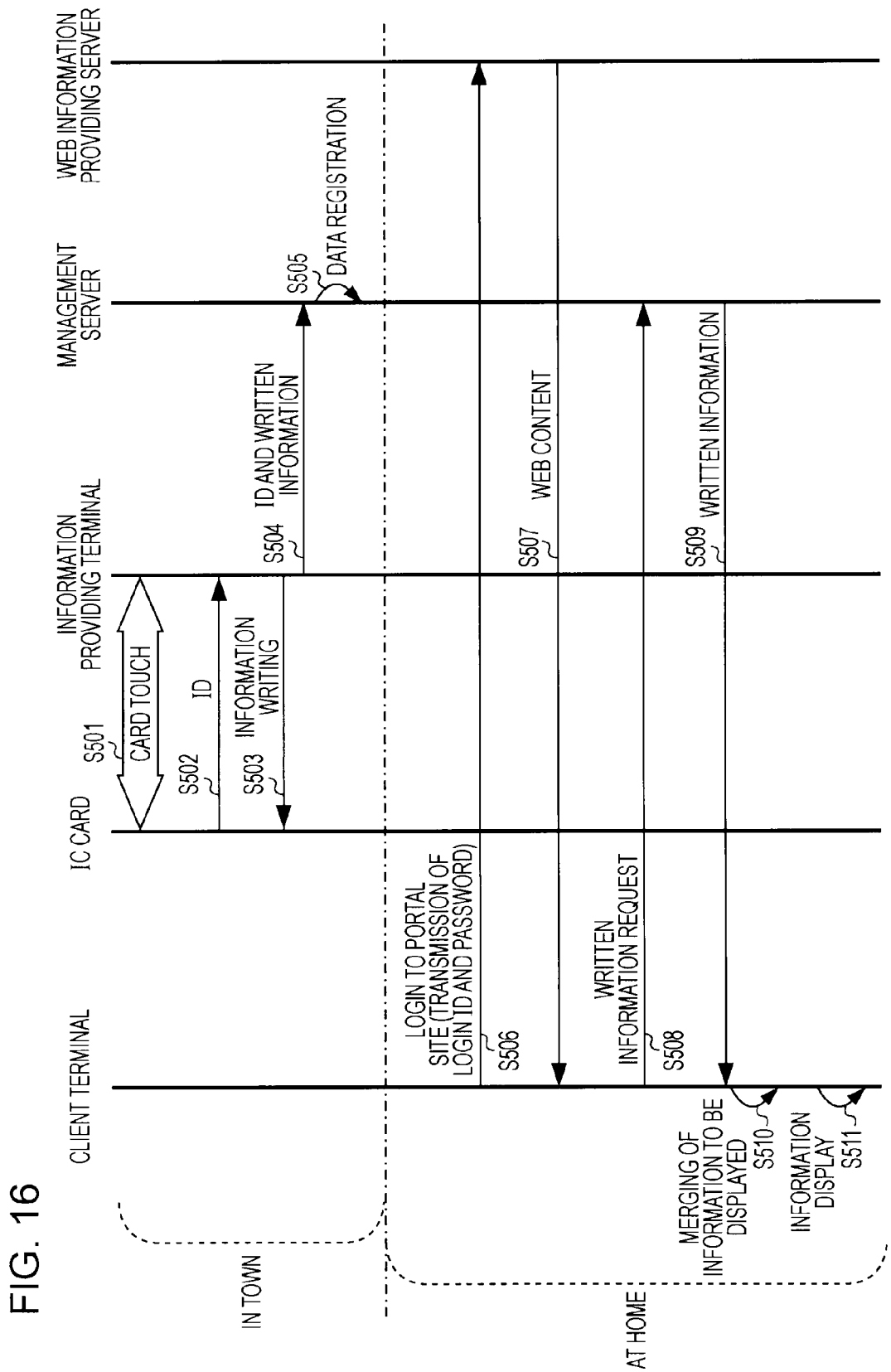

INFORMATION PROVIDING SYSTEM, APPARATUS AND METHOD FOR INFORMATION PROCESSING, AND COMPUTER PROGRAM PRODUCT

CROSS REFERENCES TO RELATED APPLICATIONS

The present application contains subject matter related to Japanese Patent Application JP 2007-282072 filed in the Japanese Patent Office on Oct. 30, 2007, and Japanese Patent Application JP 2008-195704 filed in the Japanese Patent Office on Jul. 30, 2008, the entire contents of which are incorporated herein by reference.

BACKGROUND OF THE INVENTION

1. Field of the Invention

The present invention relates to an information providing system, an apparatus and method for information processing, and a computer program. In particular, the present invention relates to an information providing system for providing information on the basis of information communicated using an IC card, an apparatus and method for information processing, and a computer program.

2. Description of the Related Art

As recognized by the inventor, there are used a system, called "digital signage", in which advertising information is displayed on a display installed in a public space or a shop (store) to provide the advertising information to users and a system in which a poster is provided with an IC chip capable of performing near field communication and information is output from the IC chip to an IC card held by a user.

In such a system, for example, a radio frequency identification (RFID) chip includes an IC circuit and an antenna and can perform contactless communication. The RFID chip is attached to a digital signage or a smart poster. When a user brings an IC card having a contactless communication function close to (or over) the RFID chip, information, e.g., product information stored in a memory in the RFID chip is transmitted to the IC card held by the user and is stored in a memory in the IC card.

To use information stored in the IC card, the user touches a personal computer (PC) having a reader/writer (R/W) function with the IC card, alternatively, holds the IC card over the PC to output the information stored in the IC card to the PC, so that the stored information can be displayed on a display of the PC. Such an information providing system is disclosed in, for example, Japanese Unexamined Patent Application Publication No. 2002-269508.

The above-described system needs a PC having the reader/writer (R/W) function for viewing information stored in an IC card. Disadvantageously, it is difficult for users having no PC with the reader/writer (R/W) function to view information stored in an IC card.

In addition, since the storage capacity of a memory included in a typical IC card is small, the amount of data stored in the IC card is limited. It is difficult to store, for example, high-quality image data in the memory of the IC card. Disadvantageously, if the user views only data stored in the IC card, the amount of information that the user can acquire is limited.

SUMMARY OF THE INVENTION

It is desirable to provide an information providing system capable of storing information communicated between a communication unit, such as an RFID chip attached on a digital signage or a smart poster, and an IC card held by a user into a server so that the user can use the stored information using a PC which has no reader/writer (R/W) function but is connectable to a network to acquire various pieces of information from the server, an apparatus and method for information processing, and a computer program product.

According to a first embodiment of the present invention, an information providing system includes the following elements. An IC card stores card ID. An information providing terminal reads out the card ID of the IC card, provides information to the IC card, and transmits the card ID and the information provided to the IC card or the ID of the provided information to a management server. The management server receives the card ID and the information provided to the IC card or the provided information ID from the information providing terminal, has a database to manage the card ID and the provided information such that the card ID is associated with the provided information, acquires the information provided to the IC card from the database in response to an information request from a client terminal, and supplies the provided information to the client terminal. The client terminal displays the provided information supplied from the management server.

In the system according to this embodiment, the client terminal may be configured to perform a process of reading out the card ID from the IC card and transmitting the read-out card ID to the management server. The management server may be configured to perform a process of searching the database on the basis of the card ID received from the client terminal to acquire the information provided to the IC card associated with the received card ID from the database and supplying the provided information to the client terminal.

In the system according to this embodiment, the management server may be configured to receive card ID and client-terminal identification information from the client terminal and register ID-associated management information in which the received card ID is associated with the client-terminal identification information. The management server may perform a process of identifying the card ID associated with the client-terminal identification information received from the client terminal on the basis of the registered ID-associated management information, acquiring the information provided to the IC card specified by the identified card ID from the database, and supplying the provided information to the client terminal.

In the system according to this embodiment, preferably, the IC card is an information processing apparatus having an IC card function.

According to a second embodiment of the present invention, an information providing system includes the following elements. An IC card stores card ID. An information providing terminal reads out the card ID of the IC card, provides information to the IC card, and transmits the card ID and the information provided to the IC card or the ID of the provided information to a management server. The management server receives the card ID and the information provided to the IC card or the provided information ID from the information providing terminal and transmits the card ID and the provided information to an information providing server such that the card ID is associated with the provided information. The information providing server receives the card ID and the information provided to the IC card or the provided information ID from the management server, has a database to manage the card ID and the provided information such that the card ID is associated with the provided information, acquires the information, provided to the IC card, from the database in response to an information request from a client terminal, and supplies the provided information to the client terminal. The client terminal displays the provided information supplied from the information providing server.

In the system according to this embodiment, the information providing server may be configured to receive card ID and client-terminal identification information from the client terminal and register ID-associated management information in which the received card ID is associated with the client-terminal identification information. The information providing server may perform a process of identifying the card ID associated with the client-terminal identification information received from the client terminal on the basis of the registered ID-associated management information, acquiring the information provided to the IC card specified by the identified card ID from the database, and supplying the provided information to the client terminal.

In the system according to this embodiment, preferably, the IC card is an information processing apparatus having an IC card function.

According to a third embodiment of the present invention, an information providing system includes the following elements. An IC card stores card ID. An information providing terminal reads out the card ID of the IC card, provides information to the IC card, and transmits the card ID and the information provided to the IC card or the ID of the provided information to a management server. The management server receives the card ID and the information provided to the IC card or the provided information ID from the information providing terminal, has a database to manage the card ID and the provided information such that the card ID is associated with the provided information, acquires the information, provided to the IC card, from the database in response to an information request from a client terminal, and supplies the provided information to the client terminal. A Web information providing server provides a Web page in response to a request from the client terminal. The client terminal merges the provided information supplied from the management server into the Web page provided by the Web information providing server and displays the resultant Web page.

In the system according to this embodiment, the Web information providing server may be configured to generate a Web page including an area for displaying information supplied from the management server to the client terminal and provides the Web page to the client terminal. The client terminal may be configured to perform a process of generating display data so that the provided information supplied from the management server is displayed in the area included in the Web page provided by the Web information providing server.

In the system according to this embodiment, the management server may be configured to receive card ID and client-terminal identification information from the client terminal and register ID-associated management information in which the received card ID is associated with the client-terminal identification information. The management server may perform a process of identifying the card ID associated with the client-terminal identification information received from the client terminal on the basis of the registered ID-associated management information, acquiring the information provided to the IC card specified by the identified card ID from the database, and supplying the provided information to the client terminal.

In the system according to this embodiment, preferably, the IC card is an information processing apparatus having an IC card function.

According to a fourth embodiment of the present invention, there is provided an information processing apparatus for performing a process of providing information to an IC card. The apparatus includes the following elements. A communication unit performs contactless near field communication to read out the card ID of the IC card and provide information to the IC card. A control unit performs a process of transmitting a combination of the card ID supplied through the communication unit and the information provided to the IC card or the ID of the provided information to a management server.

In the apparatus according to this embodiment, preferably, the IC card is an information processing apparatus having an IC card function.

According to a fifth embodiment of the present invention, there is provided an information processing apparatus for performing a process of providing information to a client terminal. The apparatus includes the following elements. A communication unit receives, from an information providing terminal that performs a process of providing information to an IC card, the card ID of the IC card provided with the information and the information provided to the IC card or the ID of the provided information. A control unit stores and manages the card ID and the provided information in a database such that the card ID is associated with the provided information and performs a process of acquiring the information, provided to the IC card, from the database in response to an information request from the client terminal, and supplying the information to the client terminal.

In the apparatus according to this embodiment, the control unit may perform a process of receiving card ID and client-terminal identification information from the client terminal, registering ID-associated management information in which the received card ID is associated with the client-terminal identification information into a storage unit, identifying the card ID associated with the client-terminal identification information received from the client terminal on the basis of the registered ID-associated management information, acquiring the information provided to the IC card specified by the identified card ID from the database, and supplying the provided information to the client terminal.

In the apparatus according to this embodiment, preferably, the IC card is an information processing apparatus having an IC card function.

According to a sixth embodiment of the present invention, there is provided a method for processing information. The method includes the steps of reading out, by an information providing terminal, the card ID of an IC card, providing information to the IC card, and transmitting the card ID and the information provided to the IC card or the ID of the provided information to a management server, receiving, by the management server, the card ID and the information provided to the IC card or the provided information ID from the information providing terminal, and recording the card ID and the provided information in a database such that the card ID is associated with the provided information, acquiring, by the management server, the information provided to the IC card from the database in response to an information request from a client terminal, and supplying the provided information to the client terminal, and displaying, by the client terminal, the provided information supplied from the management server on a display of the client terminal.

According to a seventh embodiment of the present invention, there is provided a method for processing information. The method includes the steps of reading out, by an information providing terminal, the card ID of an IC card, providing information to the IC card, and transmitting the card ID and the information provided to the IC card or the ID of the provided information to a management server, receiving, by the management server, the card ID and the information provided to the IC card or the provided information ID from the information providing terminal, and transmitting the card ID and the provided information to an information providing server such that the card ID is associated with the provided information, receiving, by the information providing server, the card ID and the information provided to the IC card or the provided information ID from the management server, and recording the card ID and the provided information in a database such that the card ID is associated with the provided information, acquiring, by the information providing server, the information provided to the IC card from the database in response to an information request from a client terminal, and supplying the provided information to the client terminal, and displaying, by the client terminal, the provided information supplied from the information providing server on a display of the client terminal.

According to an eighth embodiment of the present invention, there is provided a method for processing information. The method includes the steps of reading out, by an information providing terminal, the card ID of an IC card, providing information to the IC card, and transmitting the card ID and the information provided to the IC card or the ID of the provided information to a management server, receiving, by the management server, the card ID and the information provided to the IC card or the provided information ID from the information providing terminal, and recording the card ID and the provided information in a database such that the card ID is associated with the provided information, acquiring, by the management server, the information provided to the IC card from the database in response to an information request from a client terminal, and supplying the provided information to the client terminal, and merging, by the client terminal, the provided information supplied from the management server into a Web page provided by a Web information providing server and displaying the resultant Web page on a display of the client terminal.

According to a ninth embodiment of the present invention, there is provided a method for information processing performed in an information processing apparatus for performing a process of providing information to an IC card. The method includes the steps of performing, by a communication unit, contactless near field communication to read out the card ID of the IC card and provide information to the IC card, and performing, by a control unit, a process of transmitting a combination of the card ID supplied through the communication unit and the information provided to the IC card or the ID of the provided information to a management server.

According to a tenth embodiment of the present invention, there is provided a method for information processing performed in an information processing apparatus for performing a process of providing information to a client terminal. The method includes the steps of receiving, by a communication unit, from an information providing terminal that performs a process of providing information to an IC card, the card ID of the IC card provided with the information and the information provided to the IC card or the ID of the provided information, storing and managing, by a control unit, the card ID and the provided information in a database such that the card ID is associated with the provided information, and performing, by the control unit, a process of acquiring the information provided to the IC card from the database in response to an information request from the client terminal, and supplying the provided information to the client terminal.

According to an eleventh embodiment of the present invention, there is provided a computer program product having instructions that when executed by a CPU performs steps comprising the steps of performing, by a communication unit, contactless near field communication to read out the card ID of the IC card and provide information to the IC card, and performing, by a control unit, a process of transmitting a combination of the card ID supplied through the communication unit and the information provided to the IC card or the ID of the provided information to a management server.

According to a twelfth embodiment of the present invention, there is provided a computer program product having instructions that when executed by a CPU performs steps comprising the steps of receiving, by a communication unit, from an information providing terminal that performs a process of providing information to an IC card, the card ID of the IC card provided with the information and the information provided to the IC card or the ID of the provided information, storing, by a control unit, the card ID and the provided information in a database such that the card ID is associated with the provided information, and performing, by the control unit, a process of acquiring the information provided to the IC card from the database in response to an information request from the client terminal, and supplying the provided information to the client terminal.

The computer program product according to each of the embodiments of the present invention may be provided to general-purpose computer systems capable of executing various program codes from computer-readable storage media and communication media. Providing this computer program in computer-readable form achieves processing operations according to the program on the computer system.

Still other objects, features and advantages of the present invention will become apparent from the following more detailed description based on embodiments of the present invention which will be described below and the accompanying drawings. The term "system" in the present specification refers to a logical set of devices and the devices each serving as a component are not necessarily accommodated in a single casing.

According to an embodiment of the present invention, information obtained by communication between a communication unit provided for a digital signage or a smart poster and a user's IC card is stored into a server and the information stored in the server is used. Advantageously, a client terminal, such as a PC, having no reader/writer (R/W) function can acquire various information items from the server. Specifically, an information providing terminal transmits the card ID of an IC card and information provided to the IC card or the ID of the provided information to a management server. The management server stores and manages the card ID of the IC card associated with the provided information in a database. The management server acquires the information, provided to the IC card, from the database in response to an information request from the client terminal and supplies the information to the client terminal. Consequently, the user can acquire various information items from the server using a network-connectable PC which has no reader/writer (R/W) function.

BRIEF DESCRIPTION OF THE DRAWINGS

FIG. 8 is a sequence diagram explaining processing of setting link between a client terminal and an IC card;

FIG. 9 is a diagram explaining ID-associated management information generated by setting link between each client terminal and a corresponding IC card;

FIG. 14 is a diagram explaining merging by a client terminal in the information providing system according to the third embodiment;

FIG. 16 is a sequence diagram explaining an entire process by the information providing system according to the third embodiment.

DESCRIPTION OF THE PREFERRED EMBODIMENTS

An information providing system, an apparatus and method for information processing, and a computer program according to embodiments of the present invention will now be described in detail with reference to the drawings.

First Embodiment

Figure 1:
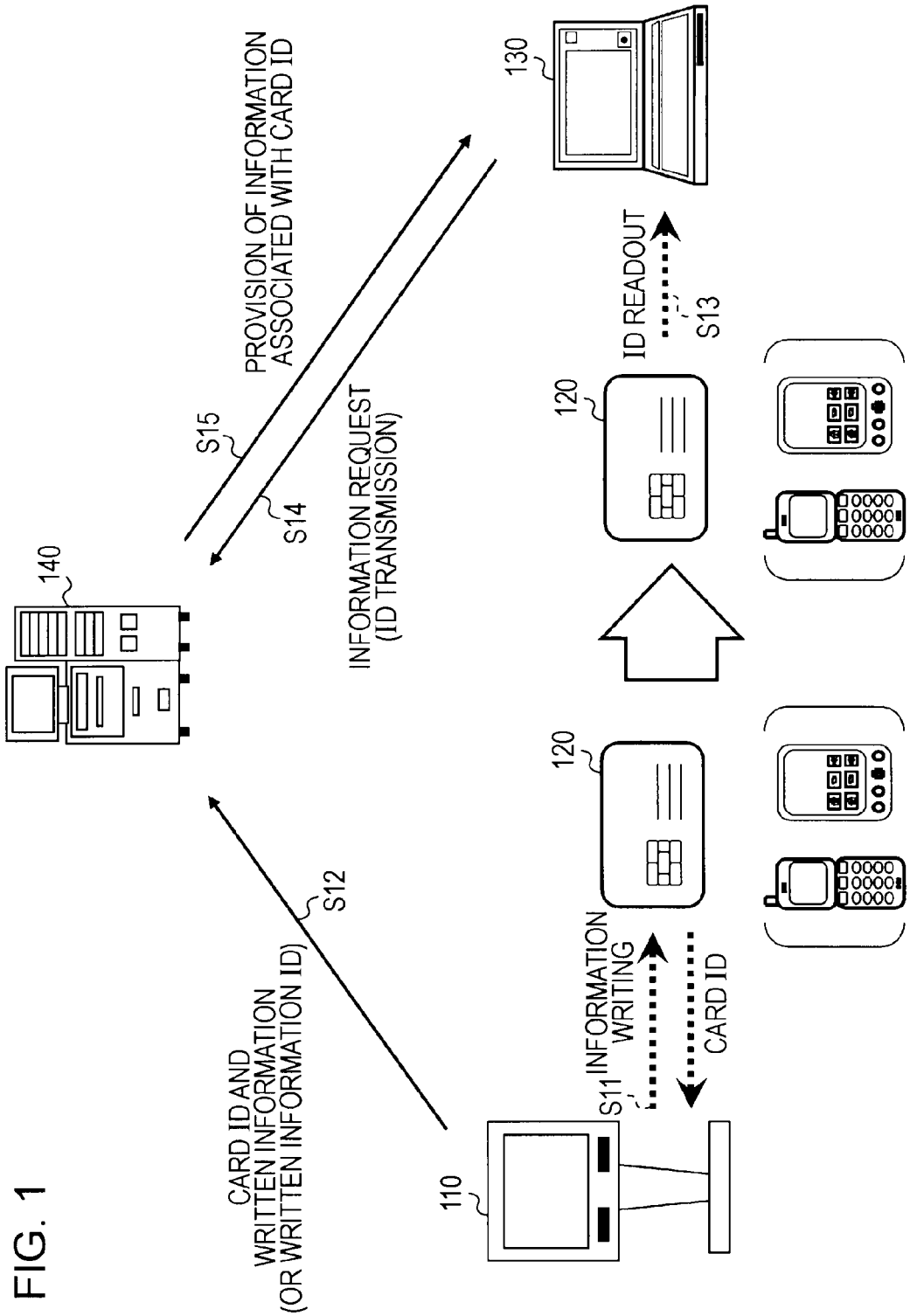
FIG. 1 is a diagram explaining the structure and process of an information providing system according to a first embodiment of the present invention.
Figure 2:
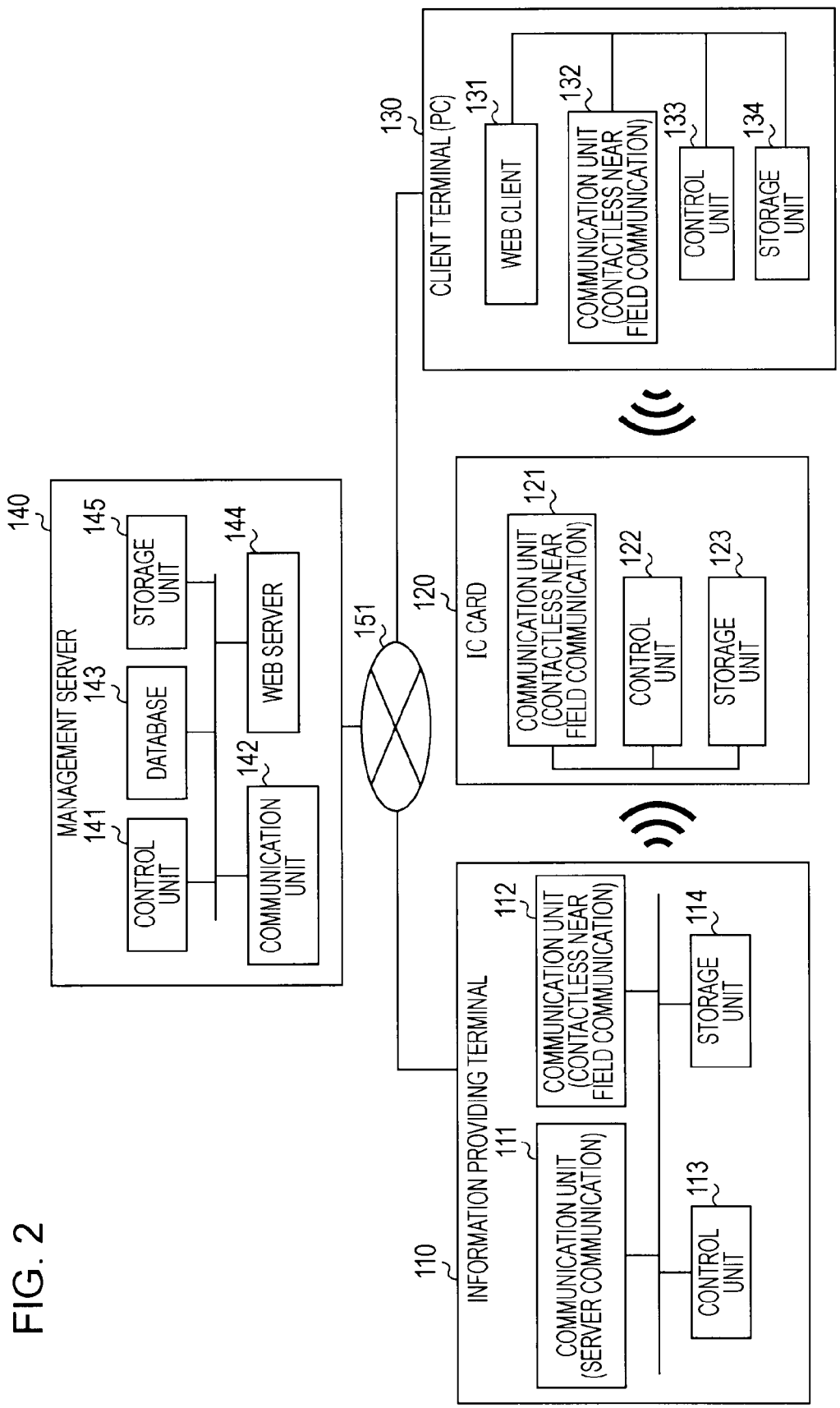
FIG. 2 is a diagram explaining exemplary constructions of components constituting the information providing system according to the first embodiment.

The structure and process of an information providing system according to a first embodiment of the present invention will now be described with reference to FIGS. 1 to 6. FIG. 1 shows the information providing system according to the first embodiment of the present invention. The system will be described in accordance with the flow of a process. A user has an IC card 120. Although two IC cards 120 are shown in FIG. 2, they represent the same IC card. The process is executed as a sequence of steps S11 to S15.

The IC card 120 is not limited to a card-type IC card and may include a mobile phone having an IC card function or an information processing apparatus, such as a portable terminal or a PC. In the following description, IC cards may conceptually include various information processing apparatuses having an IC card function in addition to a card-type IC card.

The sequence of steps S11 to S15 will be described. First, processing in step S11 is performed. The user holding the IC card 120 approaches an information providing terminal 110 which includes, for example, a digital signage or a smart poster, installed in a public space or a shop (store). The user brings the IC card 120 close to (or over) a communication unit (e.g., an RFID chip) of the information providing terminal 110. Consequently, the IC card 120 receives, for example, product information from the information providing terminal 110 and stores the received information in a storage unit (memory) in the IC card 120. On the other hand, the IC card 120 outputs IC card ID stored in the memory of the IC card 120. The information providing terminal 110 receives the ID and stores the ID in a storage unit in the terminal.

The information providing terminal 110, serving as, for example, a digital signage having a display or a smart poster provided with an RFID chip, has a structure capable of transmitting and receiving data to/from the IC card 120. For example, the information providing terminal 110 outputs product information corresponding to information displayed on the display or the poster to the IC card 120.

The IC card 120 is capable of performing contactless near field communication and includes a communication IC, such as a radio frequency IC (RFIC), for performing communication in a contact or contactless manner. The IC card 120 performs various processes, for example, a process of receiving radio waves or a magnetic field output from a reader/writer, serving as a communication partner, through an antenna, converting the radio waves or the magnetic field into electric power as data, and storing the data into the memory, a process of outputting data stored in the memory, and a process of storing externally supplied data into the memory. The IC card 120 may further include a data processing function of performing, for example, authentication.

In step S12, the information providing terminal 110, which has output information to the IC card 120 and received the card ID from the IC card 120, transmits the card ID and either the information provided to (or written into) the IC card 120 or information ID, serving as identification information assigned to the provided information, to a management server 140 via a network.

In this case, the information providing terminal 110 may transmit not only information which has been output to the IC card 120 but also information related to the output information or related information ID. Since the IC card 120 has a small memory capacity, it is difficult to store, for example, image data in the IC card 120. Accordingly, the information providing terminal 110 outputs simple data indicating, for example, the name of a product to the IC card 120 and transmits detailed information (or ID assigned to the detailed information) including image information of the product and other information to the management server 140. The management server 140 records the card ID received from the information providing terminal 110 and information including the provided information (or the ID of the provided information) in a database such that the card ID is associated with the information.

In step S13, the user having the IC card 120 comes, for example, his or her home and holds the IC card 120 over a card reader of a client terminal 130 including, e.g., a PC to read out the card ID. The client terminal 130 is not limited to the PC. The client terminal 130 may include any of various devices, such as a TV, capable of displaying information.

In step S14, the client terminal 130 transmits the read-out card ID to the management server 140 via the network. Address data, such as URL, of the management server 140 may be input by the user. Alternatively, the client terminal 130 may read out the address data, which the IC card 120 has acquired from the information providing terminal 110, stored in the memory of the IC card 120 and use the data.

When receiving the IC card ID from the client terminal 130, the management server 140 retrieves the card ID and either the provided information or the detailed information including the provided information, which have received from the information providing terminal 110, from the database. In step S15, the management server 140 outputs the retrieved information items to the client terminal 130. Consequently, the detailed information, related to a product, provided by the information providing terminal 110 can be viewed on the display of the client terminal 130.

In this embodiment, the client terminal 130 has the card reader. The client terminal 130 can directly read out information stored in the IC card 120 and display the information. As described above, since the memory capacity of the IC card 120 is small, it is difficult to store, for example, image information of a product into the memory of the IC card 120. Accordingly, such image information is not displayed on the client terminal 130 by only data transfer processing through the IC card 120. On the other hand, the client terminal 130 can receive a large amount of data through the management server 140 and display the data. Advantageously, product information can be displayed using, for example, a 3D graphic image.

Exemplary constructions of the information providing terminal 110, the IC card 120, the client terminal 130, and the management server 140 in accordance with the first embodiment of the present invention will be described below with reference to FIG. 2.

Information Providing Terminal 110

Referring to FIG. 2, the information providing terminal 110 includes a communication unit 111, a communication unit 112, a control unit 113, and a storage unit 114. The communication unit 111 communicates with the management server 140 via the network, indicated at 151. The communication unit 112 performs contactless near field communication with the IC card 120. The control unit 113 controls communication and also controls data input and output. The storage unit 114 records data to be output to the IC card 120 and the management server 140, data, such as card ID, input from the IC card 120, and a processing program.

For example, the control unit 113 performs a process of transmitting the card ID supplied through the communication unit 112 in combination with information provided to the IC card or the ID of the information to the management server 140.

IC Card 120

The IC card 120 includes a communication unit 121, a control unit 122, and a storage unit 123. The communication unit 121 performs contactless near field communication with the information providing terminal 110 or the client terminal 130, such as a PC. The control unit 122 controls communication and also controls data acquisition from a storage unit 123 and data storage into the storage unit 123. The storage unit 123 records data input from the information providing terminal 110, the card ID, and a processing program.

Client Terminal 130

The client terminal 130 includes a Web client 131, a communication unit 132, a control unit 133, and a memory unit 134. The Web client 131 serves as a program for viewing Web information provided by the management server 140 via the network 151 and also serves as a system for displaying and outputting an HTML document, an image, video, and/or audio on a Web server. The communication unit 132 performs contactless near field communication with the IC card 120. The control unit 133 controls communication and also controls data acquisition from a storage unit 134 and data storage into the storage unit 134. The storage unit 134 records data input from the IC card 120, information provided by the management server 140, and a processing program.

Management Server 140

The management server 140 includes a control unit 141, a communication unit 142, a database 143, a Web server 144, and a storage unit 145. The control unit 141 controls communication with the information providing terminal 110 and communication with the client terminal 130 and also controls access to the database 143. The communication unit 142 communicates with the information providing terminal 110 and the client terminal 130. The database 143 stores information received from the information providing terminal 110 and information to be supplied to the client terminal 130. The Web server 144 generates a Web page to be provided to the client terminal 130 and provides the Web page. The storage unit 145 stores various processing programs.

The control unit 141 associates, for example, card ID with provided information, stores the associated information items into the database 143, and manages the information items. In addition, the control unit 141 acquires information provided to the IC card 120 from the database 143 in response to an information request from the client terminal 130 and provides the acquired information to the client terminal 130.

The management server 140 may have any of the following construction:

(a) The management server 140 previously stores information items to be provided from information providing terminals to IC cards in the database 143 and appropriately supplies various provided information items to the information providing terminals; and (b) The management server 140 receives information, provided from each information providing terminal to an IC card, from the information providing terminal and manages the received information in the database.

In the construction (a), when providing information to an IC card, the information providing terminal 110 transmits the ID of the IC card and the ID of the provided information to the management server 140.

In the construction (b), when providing information to an IC card, the information providing terminal 110 transmits the ID of the IC card and actual data of the provided information to the management server 140.

Figure 3:
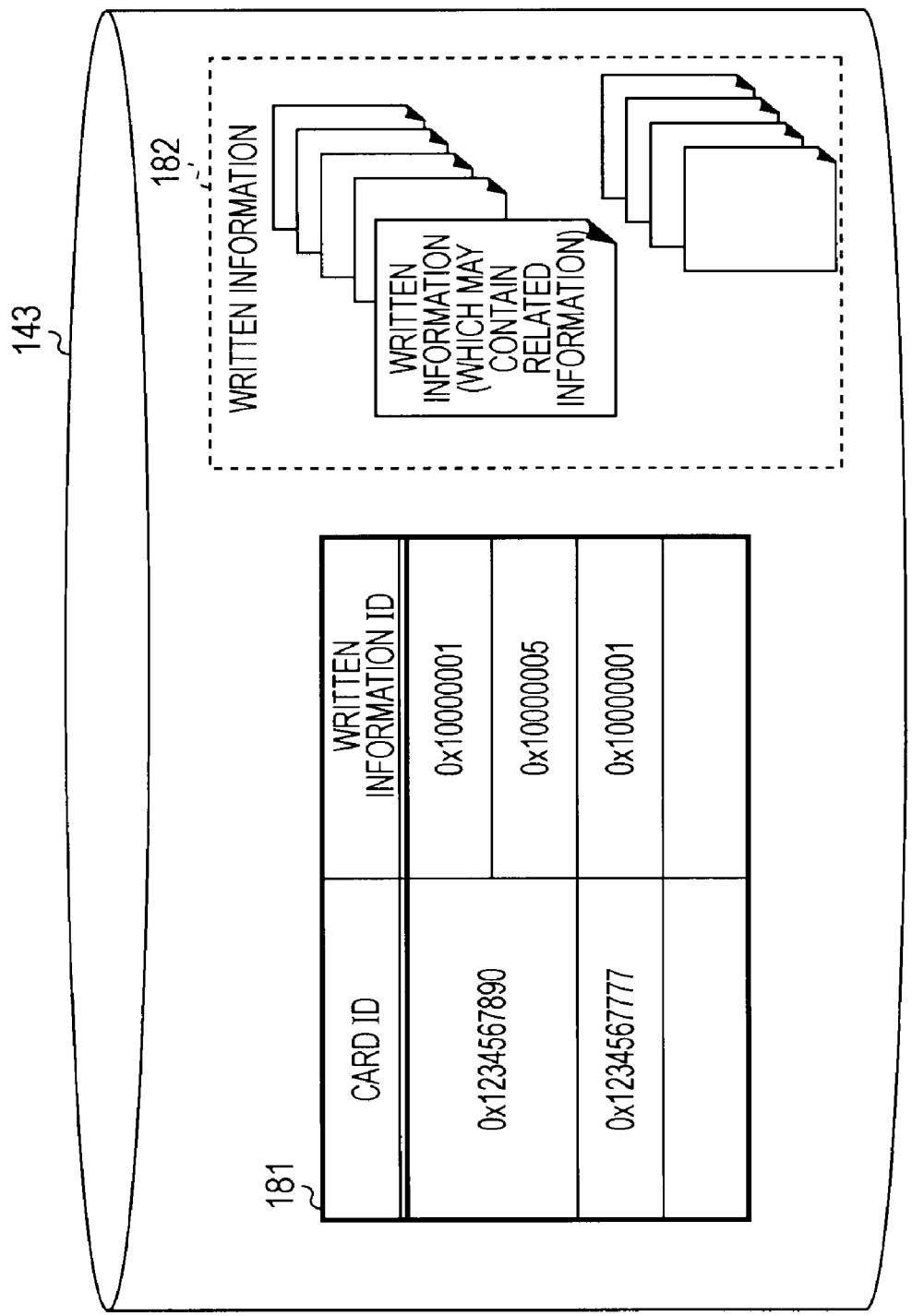
FIG. 3 is a diagram explaining an example of the data structure of a database included in a management server in the first embodiment.

FIG. 3 shows an example of data stored in the database 143 of the management server 140. The database 143 of the management server 140 stores data received from the information providing terminal 110 via the network 151. In other words, the database 143 stores information written in IC cards and information related to the written information.

Referring to FIG. 3, written information 182 written in IC cards and ID-associated management information 181 are recorded in the database 143. The ID-associated management information 181 contains the IDs of the IC cards and written information IDs. In each of the IC cards, a piece of the written information (or a written information item) 182 has been written. The written information IDs serve as identification data items assigned to the written information items 182.

When receiving card ID from the client terminal 130, the management server 140 acquires written information ID which is recorded in the ID-associated management information 181 and is associated with the card ID, and presents written information specified by the written information ID or a Web page including the specified written information and related information to the client terminal 130.

Figure 4:
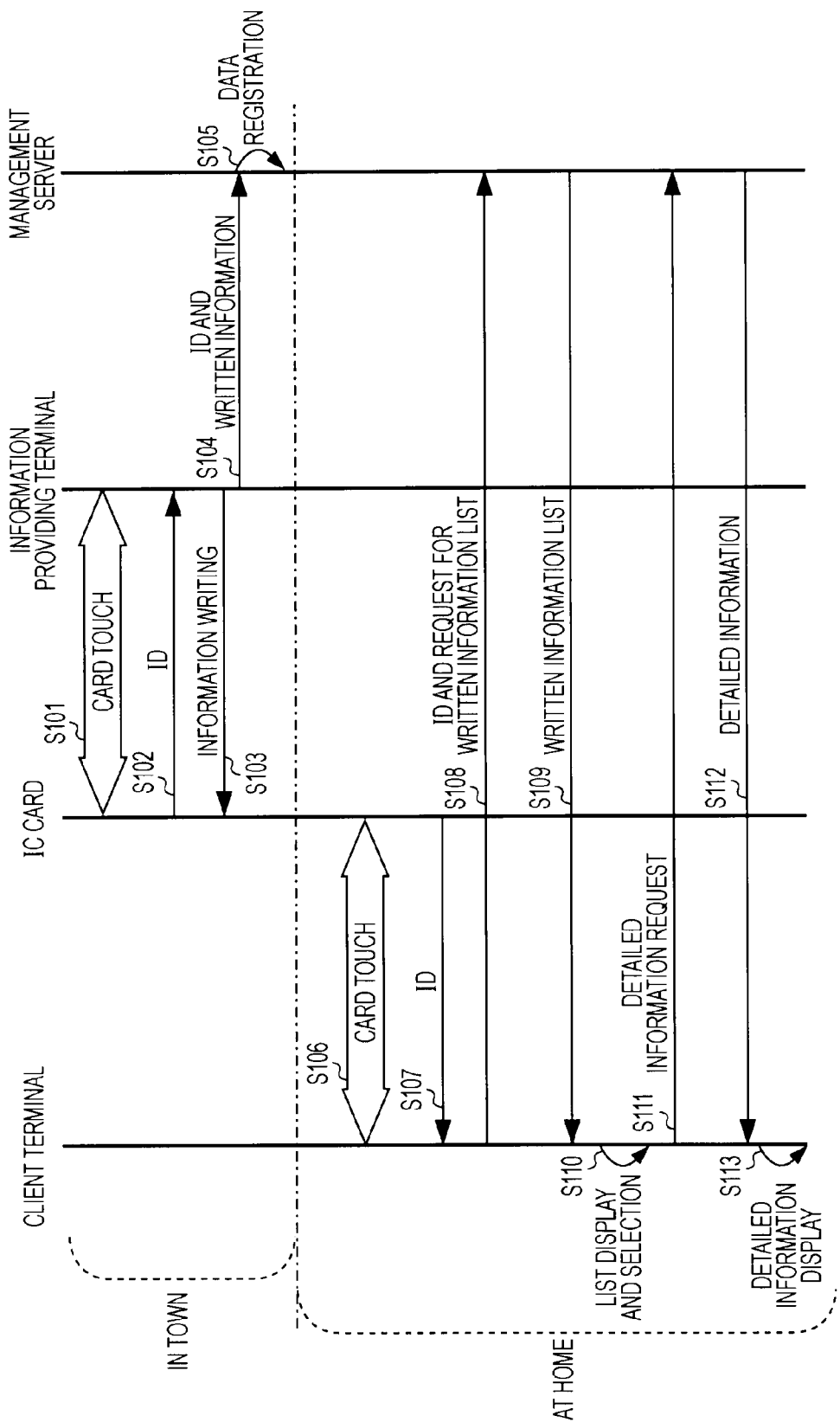
FIG. 4 is a sequence diagram explaining an entire process of the information providing system according to the first embodiment.
Figure 5:
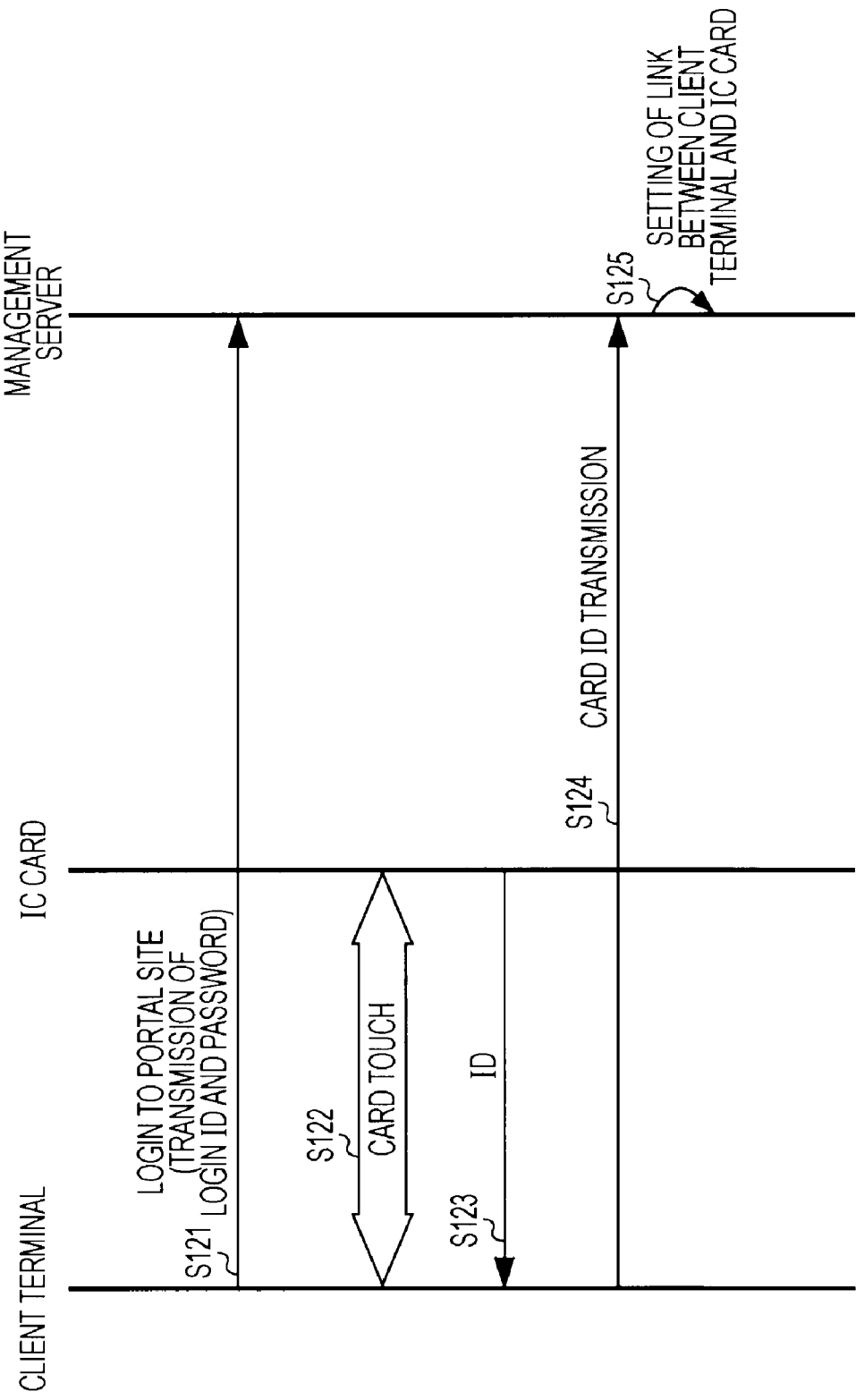
FIG. 5 is a sequence diagram explaining processing of setting link between a client terminal and an IC card.

A processing sequence will now be described with reference to FIG. 4. FIG. 4 illustrates a client terminal, an IC card, an information providing terminal, and the management server arranged in that order from the left. Steps S101 to S105 are performed when a user having the IC card brings the IC card close to (or over) the information providing terminal installed in town, such as a public space. Steps S106 to S113 are performed when the user having the IC card brings the IC card close to (or over) the client terminal installed in, for example, his or her home.

First, steps S101 to S105 will be described.

In step S101, the user having the IC card brings the IC card close to (or over) the information providing terminal installed in town, such as a public space, or touches the IC card to the information providing terminal. In step S102, IC card ID recorded in a memory of the IC card is input to the information providing terminal and is stored into a storage unit included in the information providing terminal. In step S103, the information providing terminal writes information, e.g., product information into the IC card.

In step S104, the information providing terminal transmits the IC card ID supplied from the IC card and the information (or the ID of the information) output to the IC card to the management server. In this case, the information providing terminal may further transmit information (or the ID of the information), related to the information output to the IC card, to the management server.

In step S105, the management server registers the data received from the information providing terminal into the database in the server. Consequently, the database stores, for example, the data previously described with reference to FIG. 3.

Subsequently, steps S106 to S113 will be described. Those steps are performed when the user having the IC card brings the IC card close to (or over) the client terminal installed in, for example, his or her home.

In step S106, the user having the IC card brings the IC card close to (or over) the client terminal, such as a PC, in his or her home. In step S107, the IC card ID recorded in the memory of the IC card is input to the client terminal.

In step S108, the client terminal transmits a request for a written information list together with the card ID read from the IC card to the management server via the network. Address data, such as URL, of the management server may be input by the user. Alternatively, the client terminal may read out the address data, which the IC card has acquired from the information providing terminal, stored in the memory of the IC card and use the address data.

In step S109, when receiving the request for the written information list, the management server acquires written information ID associated with the card ID from the ID-associated management information in the database, previously described with reference to FIG. 3, on the basis of the card ID contained in the received request. The management server presents a list, including simple data indicating the title of written information extracted on the basis of the written information ID and the name of a product, to the client terminal.

In step S110, the client terminal displays the list on the display so that the user selects an information item (written information), about which the user wants to acquire detailed information, from the list. In step S111, the client terminal transmits a detailed information request in combination with the selected information to the management server. In step S112, the management server selects detailed information related to the specified written information from the database and presents the detailed information to the client terminal. In step S113, the client terminal displays the detailed information on a browser. Detailed information may be information written in an IC card, i.e., written information itself. Alternatively, detailed information may contain image data that differs from information written in an IC card and has a larger amount of data than the written information.

In the sequence diagram of FIG. 4, the management server transmits the list in step S109 and transmits the detailed information in step S112. In other words, the management server performs two-stage processing. The management server may transmit detailed information in step S109.

In the sequence diagram of FIG. 4, the card ID is transmitted from the IC card to the information providing terminal in step S102, information is then written into the IC card in step S103, and after that, the ID is transmitted to the management server in step S104. Alternatively, for example, assuming that the information providing terminal is a Web browser and the management server is a Web server, the information providing terminal may display HTML screen information transmitted from the management server (Web server) and write information into an IC card as necessary.

In this case, processing can be performed by the following sequence of steps:

1) transmitting the ID from the IC card through the information providing terminal to the management server; and 2) transmitting written information (and descriptions of data to be displayed) from the management server to the information providing terminal and writing the information into the IC card.

In the sequence diagram of FIG. 4, the client terminal transmits the ID of the IC card to the management server in step S108. The management server specifies information written in the IC card on the basis of the ID of the IC card in the ID-associated management information previously described with reference to FIG. 3. Alternatively, for example, the management server may previously set link between each user's client terminal and a corresponding user's IC card. When a user logs in to a portal site using login ID on his or her client terminal, the management server may specify the IC card corresponding to the client terminal and further specify information written in the IC card on the basis of the ID-associated management information, previously described with reference to FIG. 3, using information about the specified IC card to select written information to be presented to the client terminal.

In this case, it is necessary for the management server to previously set link between each client terminal and a corresponding user's IC card. A sequence of link setting will now be described with reference to FIG. 5.

First, in step S121, a client terminal performs login to a portal site. It is assumed that the client terminal has created the portal site for exclusive use with the client terminal in a Web page provided by the management server and has set login information, such as login ID and password, for access, or Web page viewing. The login information is registered in the management server. The user can view the portal site for the client terminal by inputting the registered login information (the login ID and the password in this embodiment).

In step S121, the client terminal performs login to the portal site. In step S122, the user holds the IC card over a card reader of the client terminal or touches the IC card to the card reader. In step S123, the client terminal reads out card ID.

In step S124, the client terminal transmits the card ID read out from the IC card to the management server. In step S125, when receiving the IC card ID, the management server registers the IC card ID in association with information about the client terminal, serving as a source of the card ID, i.e., the login ID and the password of the client terminal. Consequently, setting of the link between the client terminal with the IC card is finished.

After the above-described setting of the link between the client terminal and the IC card, data received from an external information providing terminal by the IC card and information related to the data can be viewed on the Web page provided by the management server by access to the portal site from the client terminal without again sending the card ID from the client terminal to the management server.

Figure 6:
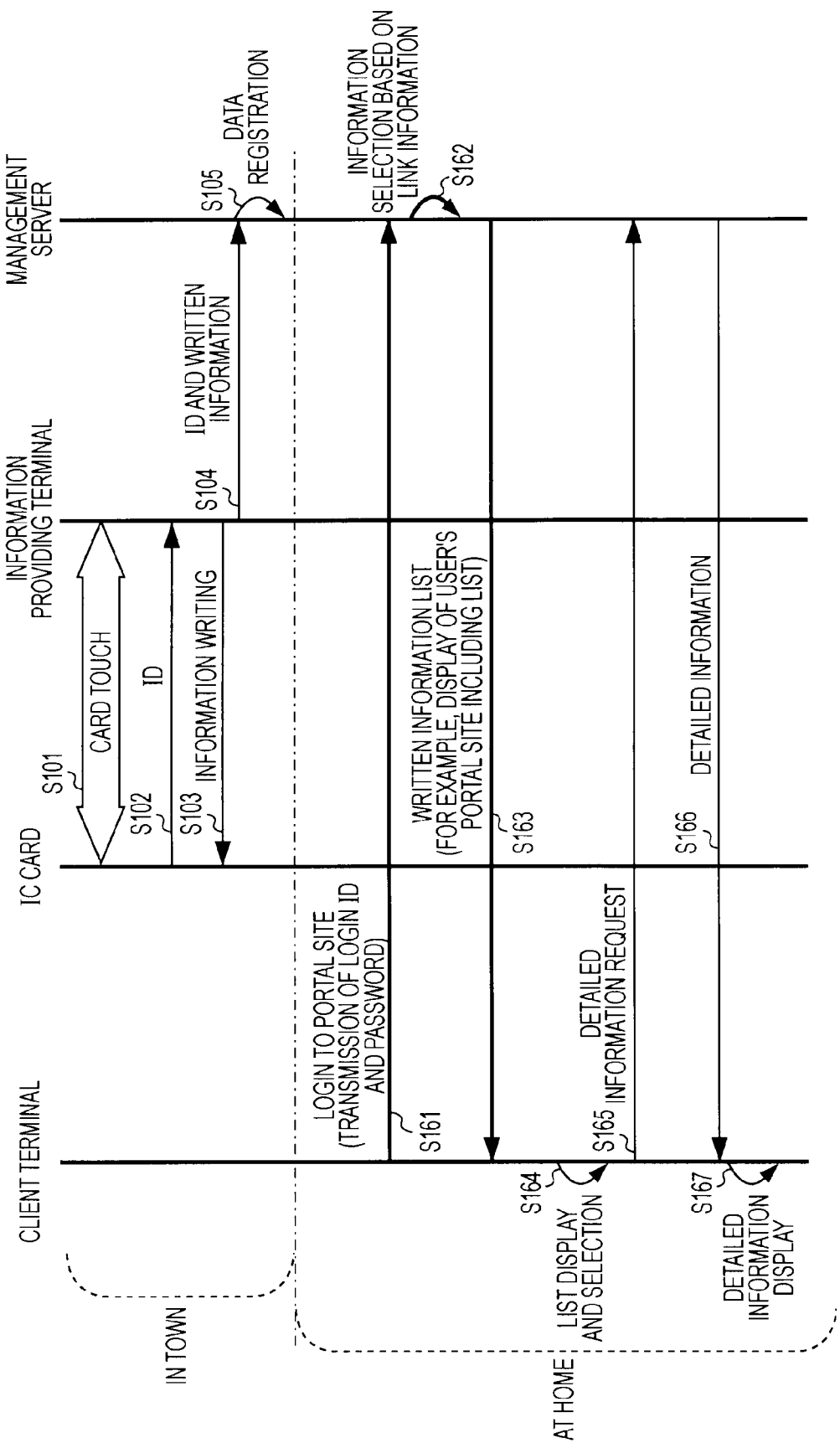
FIG. 6 is a sequence diagram explaining information providing in a case where the link between the client terminal and the IC card has been set.

A sequence describing an entire process after completion of the link setting will now be described with reference to FIG. 6. In FIG. 6, a client terminal, an IC card, an information providing terminal, and the management server are arranged in that order from the left in a manner similar to FIG. 4. Steps S101 to S105 are performed when a user having the IC card brings the IC card close to (or over) the information providing terminal installed in town, such as a public space, or touches the IC card to the information providing terminal. Those steps are the same as those described with reference to FIG. 4.

Steps S161 to S167 are performed when the user having the IC card operates the client terminal installed in, for example, his or her home to access the management server, acquires information stored in the IC card or information related to the stored information from the management server, and views the information.

In step S161, the client terminal performs login to a portal site. It is assumed that the client terminal has created the portal site for exclusive use with the client terminal on a Web page provided by the management server. The client terminal inputs login information, such as login ID and password, for access, or Web page viewing and allows for viewing of the portal site for the client terminal.

In step S162, the management server acquires IC card ID registered in association with the login information, such as the login ID and password, input from the client terminal. The management server then acquires written information ID associated with the IC card ID from the ID-associated management information in the database previously described with reference to FIG. 3 on the basis of the acquired IC card ID. In step S163, the management server presents a list, including simple data indicating the title of written information extracted on the basis of the written information ID and the name of a product, to the client terminal.

In step S164, the client terminal displays the list on the display so that the user selects a written information item, about which the user wants to acquire detailed information, from the list. In step S165, the client terminal transmits a detailed information request in combination of the selected information item to the management server. In step S166, the management server selects detailed information corresponding to the specified written information item in the database and presents the detailed information to the client terminal. In step S167, the client terminal displays the detailed information on the browser. Detailed information may be information written in an IC card, i.e., written information itself. Alternatively, detailed information may contain image data that differs from information written in an IC card and has a larger amount of data than the written information.

As described above, in this process, the control unit 141 of the management server 140 receives card ID and client terminal identification information from the client terminal 130, registers ID-associated management information, in which the received card ID is associated with the client terminal identification information, in the database or the storage unit, identifies the card ID corresponding to the client terminal identification information received from the client terminal 130 using the registered ID-associated management information, acquires information provided to the IC card specified by the identified card ID from the database 143, and provides the information to the client terminal 130.

In the sequence diagram of FIG. 6, the management server performs two-stage processing in a manner similar to the previously-described sequence in FIG. 4. In other words, the management server transmits the list in step S163 and transmits the detailed information in step S166. The management server may transmit detailed information in step S163.

In the sequence diagram of FIG. 6, the card ID is transmitted from the IC card to the information providing terminal in step S102, information is then written in the IC card in step S103, and after that, the ID is transmitted to the management server in step S104 in the same way as in the sequence of FIG. 4. Alternatively, for example, assuming that the information providing terminal is a Web browser and the management server is a Web server, the information providing terminal may display HTML screen information transmitted from the management server (Web server) and write information into an IC card as necessary.

In this case, processing can be performed by the following sequence of steps:

1) transmitting the ID from the IC card through the information providing terminal to the management server; and 2) transmitting written information (and descriptions of data to be displayed) from the management server to the information providing terminal and writing the information into the IC card.

The present embodiment has been described with respect to the case where the information providing terminal 110 outputs provided information to the IC card 120 and the output information is stored in the storage unit of the IC card 120. When the information providing system is constructed such that the client terminal 130 acquires all of information items from the management server 140, output of provided information from the information providing terminal 110 to the IC card 120 and storage of the information into the IC card 120 may be omitted.

As previously described, the IC card 120 is not limited to a card-type IC card and may include a mobile phone having an IC card function or an information processing apparatus, such as a portable terminal or a PC.

Second Embodiment

Figure 7:
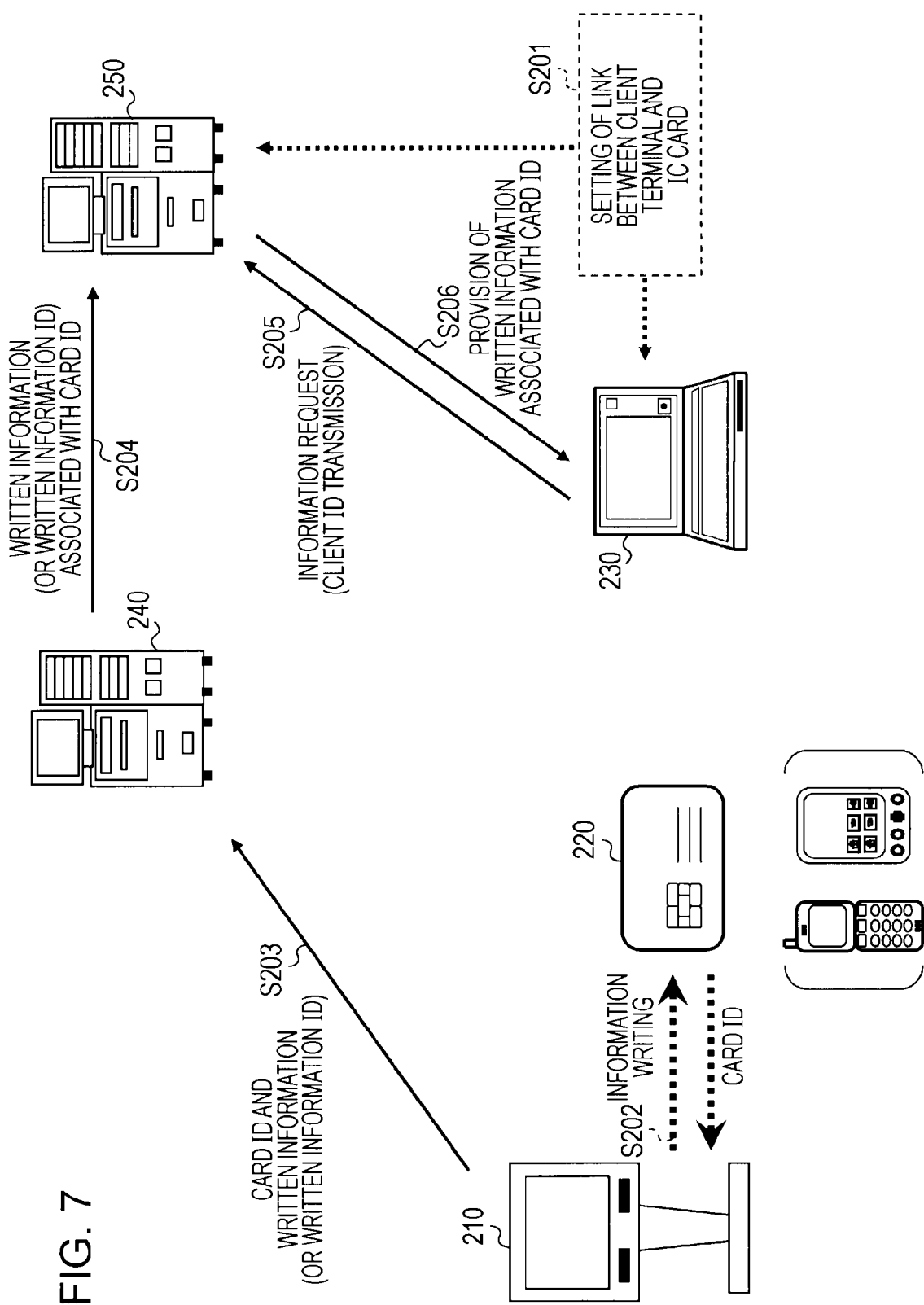
FIG. 7 is a diagram explaining the structure and process of an information providing system according to a second embodiment of the present invention.

The structure and process of an information providing system according to a second embodiment of the present invention will be described below with reference to FIGS. 7 to 12. FIG. 7 illustrates the information providing system according to the second embodiment. The second embodiment differs from the first embodiment in that a client terminal 230 does not have a function of reading data stored in an IC card, namely, a card reader function. Furthermore, in the system according to the second embodiment, the management server in the first embodiment is divided into two servers, i.e., a management server 240 and an information providing server 250 such that information is provided to the client terminal 230 by collaboration between the servers.

The flow of a process in the second embodiment will now be described. A user has an IC card 220. The IC card 220 is not limited to a card-type IC card and may include a mobile phone having an IC card function or an information processing apparatus, such as a portable terminal or a PC, in a manner similar to the foregoing embodiment. In the following description, IC cards may conceptually include various information processing apparatuses having an IC card function in addition to a card-type IC card.

The process is executed as a sequence of steps S201 to S206. Step S201 is performed in advance by communication between the client terminal 230 and the information providing server 250. Specifically, in step S201, the information providing server 250 sets link between the client terminal 230 and an IC card.

A detailed sequence describing the link setting will now be described with reference to FIG. 8. First, in step S221, the client terminal performs login to a portal site. It is assumed that the client terminal has created the portal site for exclusive use with the client terminal in a Web page provided by the information providing server and has set login information, such as login ID and password, for access, or Web page viewing. The login information is registered in the information providing server. The user can view the portal site for the client terminal by inputting the registered login information (the login ID and password in this embodiment).

In step S221, the client terminal performs login to the portal site. In step S222, the user inputs ID of the user's IC card. Specifically, the user enters the card ID using, for example, a keyboard.

In step S223, the client terminal transmits the input card ID to the information providing server. In step S224, when receiving the IC card ID, the information providing server registers the IC card ID in association with information about the client terminal, serving as a source of the card ID, i.e., the login ID and password of the client terminal. Consequently, setting of the link between the client terminal and the IC card is completed.

The information providing server registers ID-associated management information, as shown in FIG. 9, in a database. Specifically, the ID-associated management information in which each IC card ID is associated with the login ID and password of a corresponding client terminal is registered in the database. After the above-described setting of the link between the client terminal and the IC card, data received from an external information providing terminal by the IC card and related information can be viewed on the Web page provided by the information providing server by access to the portal site from the client terminal without again transmitting the card ID from the client terminal to the information providing server.

The sequence describing the entire process in the second embodiment will be again described with reference to FIG. 7. The processing described with reference to FIGS. 8 and 9 is advanced registration in step S201 in FIG. 7. After that, step S202 and subsequent steps are performed.

In step S202, the user having the IC card 220 moves close to an information providing terminal 210 that includes a digital signage or a smart poster installed in a public space or a shop (store) and brings the IC card 220 close to (or over) a communication unit (e.g., an RFID chip) included in the information providing terminal 210. Consequently, the IC card 220 receives, for example, product information from the information providing terminal 210 and stores the information in a storage unit (memory) in the IC card 220. In addition, the IC card 220 outputs its ID stored in the memory therein to the information providing terminal 210. The information providing terminal 210 receives the card ID and stores the ID in a storage unit in the terminal.

The information providing terminal 210 is, for example, a digital signage having a display or a smart poster mounted with an RFID chip. The information providing terminal 210 has a structure capable of transmitting and receiving data to/from the IC card 220. The information providing terminal 210 outputs, for example, product information corresponding to information displayed on the display or shown in the poster to the IC card.

The IC card 220 is capable of performing contactless near field communication and includes a communication IC, such as a radio frequency IC (RFIC), for performing communication in a contact or contactless manner. The IC card 220 performs various processes, for example, a process of receiving radio waves or a magnetic field output from a reader/writer, serving as a communication partner, through an antenna, converting the radio waves or the magnetic field into electric power as data, and storing the data into the memory, a process of outputting data stored in the memory, and a process of storing externally supplied data into the memory. The IC card 220 may further include a data processing function of performing, for example, authentication.

In step S203, the information providing terminal 210, which has output information to the IC card 220 and received the card ID from the IC card 220, transmits the card ID and either the information provided to (or written into) the IC card 220 or information ID, serving as identification information assigned to the provided information, to a management server 240 via a network.

In this case, the information providing terminal 210 may transmit not only information which has been output to the IC card 220 but also information related to the output information or the ID of the related information. Since the IC card 220 has a small memory capacity, it is difficult to store, for example, image data in the IC card 220. Accordingly, the information providing terminal 210 outputs simple data indicating, for example, the name of a product to the IC card 220 and transmits detailed information (or ID assigned to the detailed information) including image information of the product and other information to the management server 240.

In step S204, the management server 240 transmits a set of associated information items received from the information providing terminal 210, i.e., the card ID associated with the information provided to the IC card (or the ID of the provided information) to the information providing server 250.

The information providing server 250 associates the received card ID with the received information (or ID thereof) provided to the IC card and records the associated information items in the database. As previously described with reference to FIG. 9, the information providing server 250 has registered the ID-associated management information, in which each IC card ID is associated with the login ID and password of the corresponding client terminal, in the database in advance in step S201. The information providing server 250 additionally writes the provided information (or the ID thereof), received from the management server 240, into the ID-associated management information. Consequently, the database of the information providing server 250 contains data shown in FIG. 10.

The database, indicated at 251, included in the information providing server 250 contains the ID-associated management information, indicated at 281, and written information 282. The ID-associated management information 281 contains the associated information items, i.e., the IC card IDs associated with the login IDs and passwords of the corresponding client terminals described with reference to FIG. 9 and further contains the additionally written IDs of written information items, provided to the respective IC cards, received from the management server 240.

When receiving the login ID and password from the client terminal 230, the information providing server 250 acquires written information ID recorded in association with the login ID and the password in the ID-associated management information 281 and presents written information, specified using the written information ID, or a Web page including the written information and related information to the client terminal 230.

The information providing server 250 may have any of the following construction:

(a) The information providing server 250 previously stores information items to be provided from information providing terminals to IC cards in the database 251 and appropriately supplies various provided information items to the information providing terminals; and (b) The information providing server 250 receives information, provided from each information providing terminal to an IC card, from the information providing terminal and manages the received information in the database.

In the construction (a), when providing information to an IC card, the information providing terminal 210 transmits the ID of the IC card and the ID of the provided information to the management server 250.

In the construction (b), when providing information to an IC card, the information providing terminal 210 transmits the ID of the IC card and actual data of the provided information to the management server 240. The management server 240 transmits the ID of the IC card and the actual data of the provided information to the information providing server 250.

Figure 10:
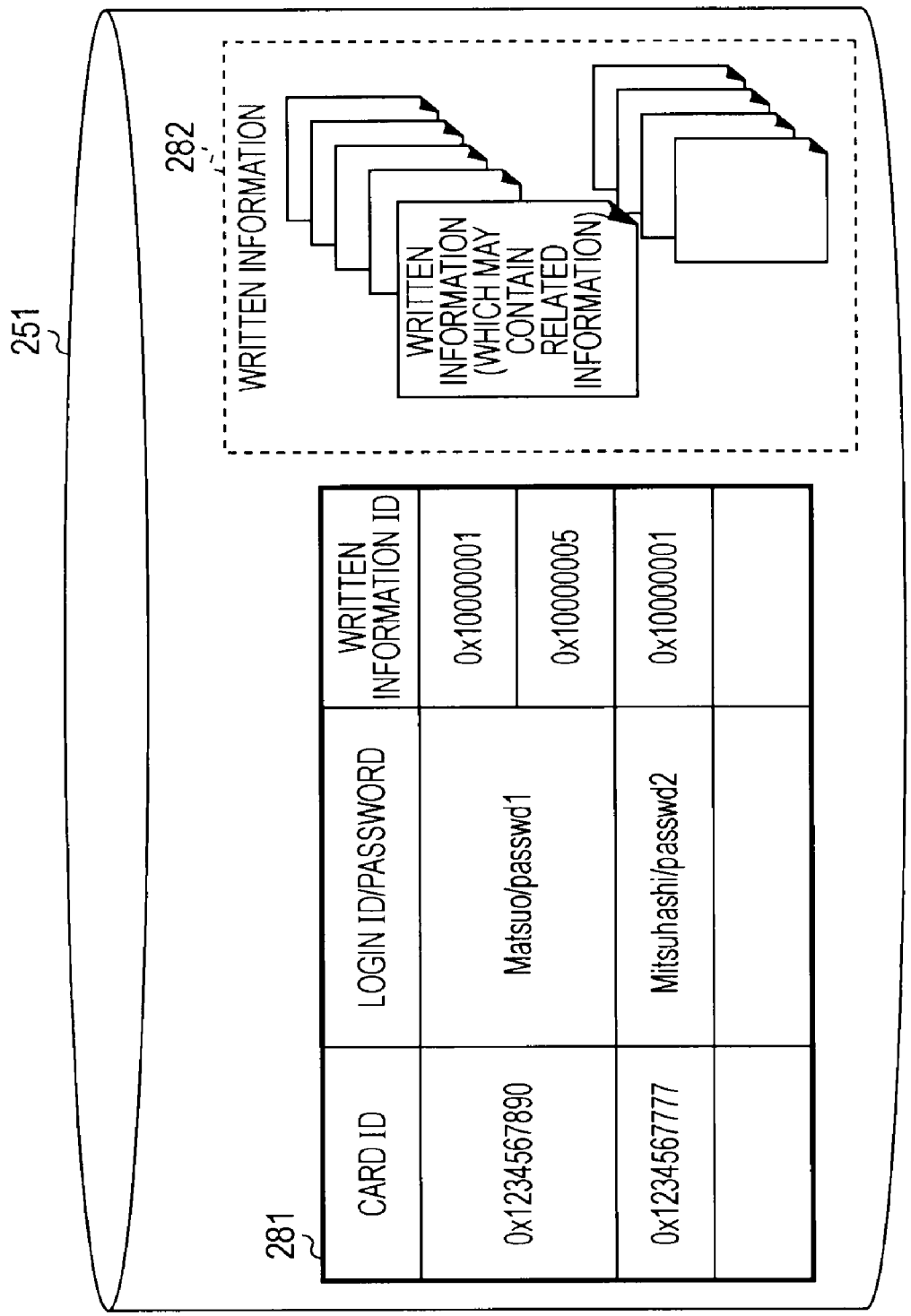
FIG. 10 is a diagram explaining the data structure of a database included in an information providing server in the second embodiment of the present invention.

The sequence describing the entire process will again be described with reference to FIG. 7. In step S204, the information providing server 250 receives information from the management server 240 and stores the information in the database as shown in FIG. 10. In step S205, the client terminal 230 performs login to the portal site provided by the information providing server 250. As described above, the client terminal 230 has created the portal site for exclusive use with the client terminal in the Web page provided by the information providing server 250 and has set the login information, i.e., the login ID and the password for access, or Web page viewing. The user can view the portal site for the client terminal by inputting the registered login information (the login ID and the password in this embodiment).

In step S206, the information providing server 250 uses the login information, i.e., the login ID and the password input from the client terminal 230 as a retrieval key to acquire the IC card ID and the written information ID from the ID-associated management information 281 in the database 251 shown in FIG. 10, and provides written information, extracted on the basis of the written information ID, to the client terminal 230. The client terminal 230 may include a PC or any of various devices, such as a TV, capable of displaying information.

In this embodiment, although the client terminal 230 has no card reader and does not directly read out information stored in the IC card 220 and display the read-out information, the user can view information stored in the IC card 220 and information related to the stored information on the client terminal 230 through the information providing server 250.

Figure 11:
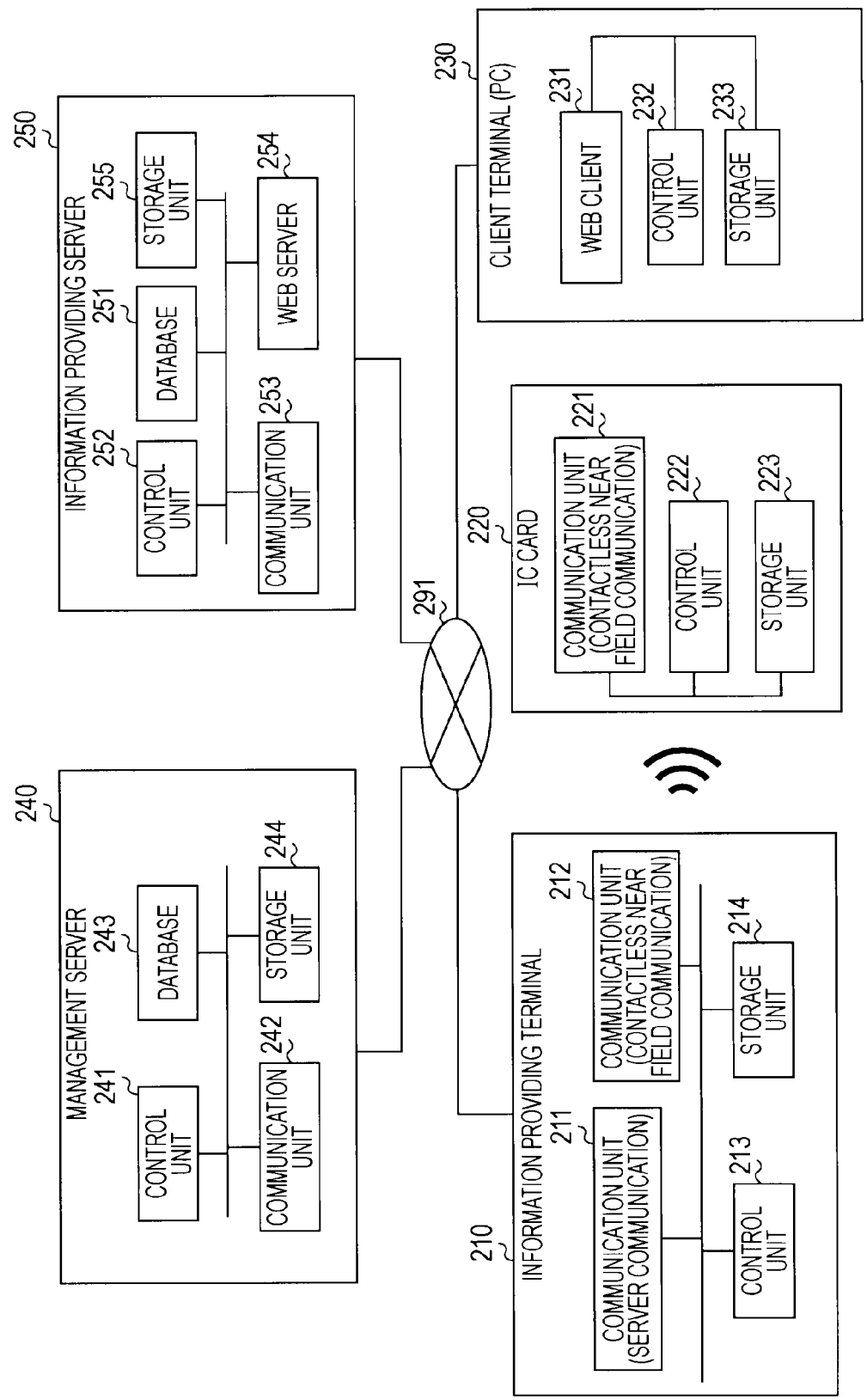
FIG. 11 is a diagram explaining exemplary constructions of components constituting the information providing system according to the second embodiment.

Exemplary constructions of the information providing terminal 210, the IC card 220, the client terminal 230, the management server 240, and the information providing server 250 in accordance with the second embodiment of the present invention will be described with reference to FIG. 11.

Information Providing Terminal 210

The information providing terminal 210 has the same construction as that of the information providing terminal 110 in the first embodiment. The information providing terminal 210 includes a communication unit 211, a communication unit 212, a control unit 213, and a storage unit 214. The communication unit 211 communicates with the management server 240 via a network 291. The communication unit 212 performs contactless near field communication with the IC card 220. The control unit 213 controls communication and also controls data input and output. The storage unit 214 records data to be output to the IC card 220 and the management server 240, data, such as card ID, input from the IC card 220, and a processing program.

IC Card 220

The IC card 220 has the same construction as that of the IC card 120 in the first embodiment. The IC card 220 includes a communication unit 221, a control unit 222, and a storage unit 223. The communication unit 211 performs contactless near field communication with the information providing terminal 210. The control unit 222 controls communication and also controls data acquisition from the storage unit 223 and data storage into the storage unit 223. The storage unit 223 records data input from the information providing terminal 210, the card ID, and a processing program.

Client Terminal 230

The client terminal 230 differs from the client terminal 130 in the first embodiment in that the client terminal 230 does not include a communication unit for performing contactless near field communication with the IC card 220. In this embodiment, the client terminal 230 includes a Web client 231, a control unit 232, and a storage unit 233. The Web client 231 serves as a program for viewing Web information provided by the information providing server 250 via the network 291 and also serves as a system for displaying and outputting an HTML document, an image, video, and/or audio on a Web server. The control unit 232 controls communication and also controls data acquisition from the storage unit 233 and data storage into the storage unit 233. The storage unit 233 records information provided by the information providing server 250, and a processing program.

Management Server 240

The management server 240 includes a control unit 241, a communication unit 242, a database 243, and a storage unit 244. The control unit 241 controls communication with the information providing terminal 250 and controls access to the database 243. The communication unit 242 communicates with the information providing terminal 210 and the information providing server 250. The database 243 stores information received from the information providing terminal 210 and information to be provided to the information providing server 250. The storage unit 244 stores various processing programs.

Information Providing Server 250

The information providing server 250 includes the database 251 previously described with reference to FIG. 10, a control unit 252, a communication unit 253, a Web server 254, and a storage unit 255. The database 251 stores the ID-associated management information 281 and the written information 282. The ID-associated management information 281 contains the IC card IDs associated with the login IDs and passwords of the client terminals and further contains the additionally written IDs of written information items, provided to the IC cards. The control unit 252 controls communication with the management server 240 and that with the client terminal 230 and also controls access to the database 251. The communication unit 253 communicates with the management server 240 and the client terminal 230. The Web server 254 generates a Web page to be provided to the client terminal 230 and provides the Web page to the client terminal 230. The storage unit 255 stores various processing programs.

Figure 12:
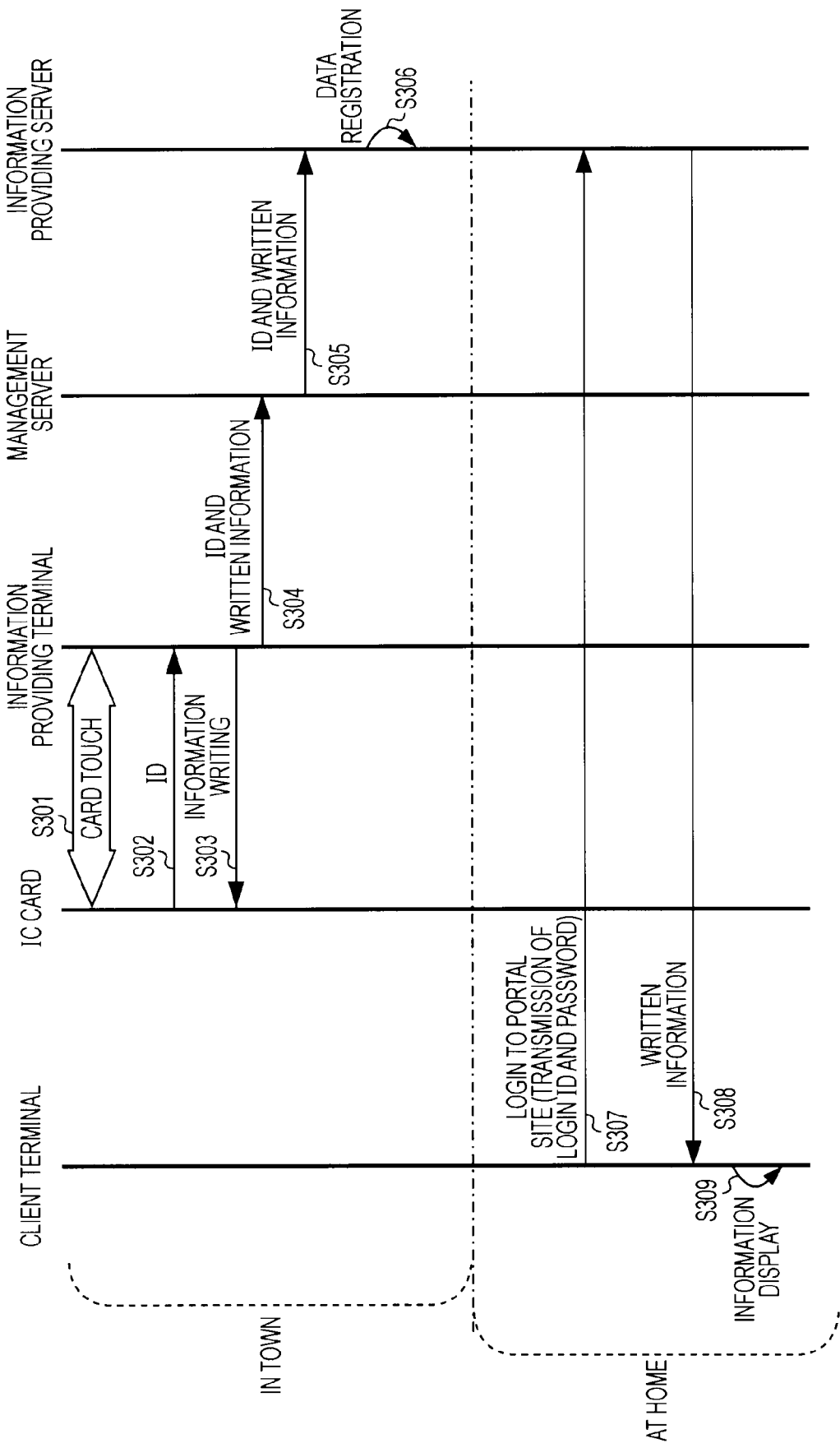
FIG. 12 is a sequence diagram explaining an entire process by the information providing system according to the second embodiment.

A processing sequence will now be described with reference to FIG. 12. FIG. 12 illustrates a client terminal, an IC card, an information providing terminal, the management server, and the information providing server arranged in that order from the left. Steps S301 to S306 are carried out when a user having the IC card brings the IC card close to (or over) the information providing terminal installed in town, such as a public space. Steps S307 to S309 are carried out when the user having the IC card operates the client terminal to access the information providing server at, for example, the user's home in which the client terminal is installed.

It is assumed that step S201 in FIG. 7 has been performed as advanced processing prior to step S301 in this sequence diagram. In other words, it is assumed that the information providing server has performed setting of link between the client terminal and the IC card as described above with reference to FIG. 8 and has stored ID-associated management information in the database, the ID-associated management information containing the login IDs and passwords assigned to client terminals and the IDs of IC cards such that each IC card ID is associated with the login ID and password of the corresponding client terminal as described with reference to FIG. 9.

First, steps S301 to S309 will be described. In step S301, the user having the IC card brings the IC card close to (or over) the information providing terminal installed in town, such as a public space, or touches the IC card to the information providing terminal. In step S302, the IC card ID stored in a memory included in the IC card is input to the information providing terminal and is then stored into a storage unit included in the information providing terminal. In step S303, the information providing terminal writes information, such as product information, into the IC card.

In step S304, the information providing terminal transmits the IC card ID acquired from the IC card and the information (or the ID of the information) output to the IC card, to the management server. In this case, the information providing terminal may further transmit information (or the ID of the information), related to the information output to the IC card, to the management server.

In step S305, the management server transmits the data received from the information providing terminal to the information providing server. In step S306, the information providing server registers the data received from the management server into the database. Consequently, the database stores, for example, the data described above with reference to FIG. 10.

Subsequently, steps S307 to S309 will be described. Those steps are carried out when the user having the IC card operates the client terminal to access the information providing terminal at the user's home in which the client terminal is installed.

In step S307, the client terminal performs login to a portal site provided by the information providing server. It is assumed that the client terminal has created the portal site for exclusive use with the client terminal in a Web page provided by the information providing server and has set login information, such as login ID and password, for access, or Web page viewing. The user views the portal site for the client terminal by inputting the registered login information (the login ID and the password in this embodiment).

When receiving the login information (the login ID and the password) as a request for viewing the portal site from the client terminal, the information providing server acquires written information ID associated with the login information (the login ID and the password) from the ID-associated management information 181 in the database described with reference to FIG. 10 and acquires written information specified by the written information ID. In step S308, the information providing server presents the written information on the portal site for the client terminal. In step S309, the written information can be viewed on the client terminal.

In this embodiment, written information can be set so as to be directly viewable. As described with reference to the sequence diagram of FIG. 6 in the first embodiment, a list containing written information may be first presented to the user so that the user selects any item in the list and detailed information about the selected item may be presented.

In the sequence diagram of FIG. 12, the card ID is transmitted from the IC card to the information providing terminal in step S302, information is then written into the IC card in step S303, and after that, the card ID is then transmitted to the management server in step S304. Alternatively, for example, assuming that the information providing terminal is a Web browser and the management server is a Web server, the information providing terminal may display HTML screen information transmitted from the management server (Web server) and write information into an IC card as necessary.

In this case, processing can be performed by the following sequence of steps:

1) transmitting the ID from the IC card through the information providing terminal to the management server; and
2) transmitting written information (and descriptions of data to be displayed) from the management server to the information providing terminal and writing the information into the IC card.

In this embodiment, although the client terminal has no reader function for reading descriptions of data written in the IC card, the written data and information related to the written data can be acquired through the information providing server and be viewed on the client terminal.

Like the first embodiment, the system according to the present embodiment is constructed such that provided information is output from the information providing terminal 210 to the IC card 220 and the information is stored in the storage unit in the IC card 220. When the system is constructed such that the client terminal 230 obtains all of information items from the information providing server 250, output of provided information from the information providing terminal 210 to the IC card 220 and storage of the provided information into the IC card 220 may be omitted.

As described above, the IC card 220 is not limited to a card type IC card and may include a mobile phone having an IC card function or an information processing apparatus, such as a portable terminal or a PC.

Third Embodiment

Figure 13:
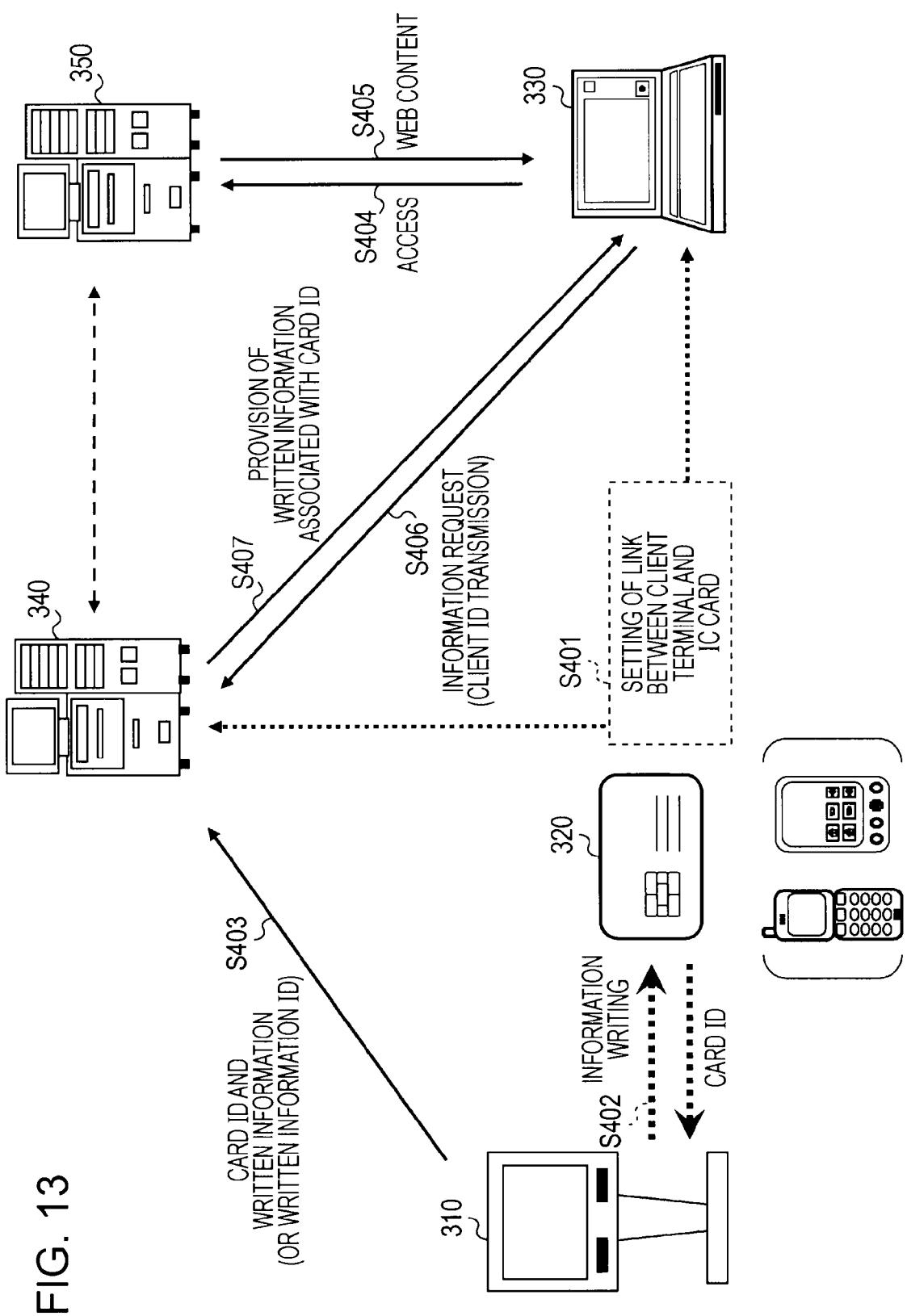
FIG. 13 is a diagram explaining the structure and process of an information providing system according to a third embodiment of the present invention.

The structure and process of an information providing system according to a third embodiment of the present invention will now be described with reference to FIGS. 13 to 16. FIG. 13 illustrates the information providing system according to the third embodiment of the present invention. Like the second embodiment, a client terminal 330 in the third embodiment does not have a function of reading data stored in an IC card, i.e., a card reader function. The system according to the present embodiment includes a management server 340 for providing information to be written to an IC card in a manner similar to the management server in the first embodiment, and further includes a Web information providing server 350 for providing Web information. In the third embodiment, the client terminal 330 performs processing for merging written information provided to an IC card by the management server 340 into a Web page provided by the Web information providing server 350.

The flow of a process in the third embodiment will now be described. A user has an IC card 320. Like the foregoing embodiments, the IC card 320 is not limited to a card-type IC card and may include a mobile phone having an IC card function or an information processing apparatus, such as a portable terminal or a PC. In the following description, IC cards may conceptually include various information processing apparatuses having an IC card function in addition to a card-type IC card.

The process is executed as a sequence of steps S401 to S407. Step S401 is performed in advance by communication between the client terminal 330 and the management server 340. In step S401, the management server 340 sets link between the client terminal 330 and an IC card.

The link setting is the same as that described with reference to FIG. 8 in the second embodiment. According to this processing, the management server 340 registers ID-associated management information in a database, the ID-associated management information containing IC card IDs, and login IDs and passwords of client terminals such that each IC card ID is associated with the login ID and password of the corresponding client terminal as described with reference to FIG. 9. After the management server 340 sets link between a client terminal and a corresponding IC card, the client terminal can acquire data, received from an external information providing terminal by the IC card, and information related to the data from the management server 340 by inputting the login ID and password without sending the card ID to the management server 340.

After advanced registration in step S401 in FIG. 13, step S402 and subsequent steps are executed. In step S402, a user having the IC card 320 moves close to an information providing terminal 310 including a digital signage or a smart poster installed in a public space or a shop (store), and brings the IC card 320 close to (or over) a communication unit (for example, an RFID chip) included in the information providing terminal 310. Consequently, the IC card 320 receives, for example, product information from the information providing terminal 310 and stores the information into a storage unit (memory) in the IC card 320. In addition, the IC card 320 outputs its ID stored in the memory of the IC card 320 to the information providing terminal 310. The information providing terminal 310 receives the IC card ID and stores the ID in a storage unit in the terminal.

The information providing terminal 310 is, for example, a digital signage having a display or a smart poster mounted with an RFID chip. The information providing terminal 310 has a structure capable of transmitting and receiving data to/from the IC card 320. The information providing terminal 310 outputs, for example, product information corresponding to information displayed on the display or shown in the poster to the IC card.

The IC card 320 is capable of performing contactless near field communication and includes a communication IC, such as a radio frequency IC (RFIC), for performing communication in a contact or contactless manner. The IC card 320 performs various processes, for example, a process of receiving radio waves or a magnetic field output from a reader/writer, serving as a communication partner, through an antenna, converting the radio waves or the magnetic field into electric power as data, and storing the data into the memory, a process of outputting data stored in the memory, and a process of storing externally supplied data into the memory. The IC card 320 may further include a data processing function of performing, for example, authentication.

In step S403, the information providing terminal 310, which has output information to the IC card 320 and received the card ID from the IC card 320, transmits the card ID and either the information provided to the IC card or information ID, serving as identification information assigned to the provided information, to the management server 340 via a network.

In this case, the information providing terminal 310 may transmit not only information which has been output to the IC card 320 but also information related to the output information or the ID of the related information. Since the IC card 320 has a small memory capacity, it is difficult to store, for example, image data in the IC card 320. Accordingly, the information providing terminal 310 outputs simple data indicating, for example, the name of a product to the IC card 320 and transmits detailed information (or ID assigned to the detailed information) including image information of the product and other information to the management server 340.

The management server 340 has registered the ID-associated management information, in which each IC card ID is associated with the login ID and password of the corresponding client terminal, in the database in advance in step S401. The management server 340 additionally writes the provided information (or the ID thereof), received from the information providing terminal 310, into the ID-associated management information. Consequently, the database of the management server 340 contains data similar to that shown in FIG. 10 described in the second embodiment.

In step S404, the client terminal 330 accesses the Web information providing server 350. For example, the client terminal 330 inputs the login ID and the password, thereby accessing the Web information providing server 350. In step S405, the client terminal 330 displays a portal site provided by the Web information providing server 350. The client terminal 330 may include any of various devices, such as a PC or a TV, capable of displaying information.

In step S406, the client terminal 330 further accesses the management server 340. For example, the client terminal 330 inputs the login ID and the password, thereby accessing the management server 340. In step S407, the management server 340 uses the login information, such as the login ID and password, input from the client terminal 330 as a retrieval key to acquire the IC card ID and the written information ID from the ID-associated management information 281 in the database shown in FIG. 10, and provides written information, extracted on the basis of the written information ID, to the client terminal 330.

The client terminal 330 merges the written information provided by the management server 340 into a Web page provided by the Web information providing server 350. For example, the Web page provided by the Web information providing server 350 includes an area for displaying written information provided by the management server 340. The client terminal merges the information items provided by the two different servers and displays the resultant information.

A concrete example of merging will now be described with reference to FIG. 14. FIG. 14 illustrates the following information items provided to the client terminal by the respective servers:

(A) Web page provided by the Web information providing server 350; and (B) Written information provided by the management server 340.

The Web page (A) provided by the Web information providing server 350 includes an area for displaying written information provided by the management server 340. In FIG. 14, this area is indicated by <embed URL="www.kanri-server . . . >. The client terminal performs merging so as to write the written information (B) provided by the management server 340 over such a data insertion area on the Web page provided by the Web information providing server 350, so that the information items provided by the two different servers can be displayed and viewed on the same screen.

Like the first embodiment, the management server 340 in the third embodiment may have any of the following constructions:

(a) The management server 340 previously stores information items to be provided from information providing terminals to IC cards in the database and appropriately supplies various provided information items to the information providing terminals; and (b) The management server 340 receives information, provided from each information providing terminal to an IC card, from the information providing terminal and manages the received information in the database.

In the construction (a), when providing information to an IC card, the information providing terminal 310 transmits the ID of the IC card and the ID of the provided information to the management server 340.

In the construction (b), when providing information to an IC card, the information providing terminal 310 transmits the ID of the IC card and actual data of the provided information to the management server 340.

In the present embodiment, although the client terminal 330 has no card reader and does not directly read out information stored in the IC card 320 and display the information, the user can view information stored in the IC card 320 and information related to the stored information on the client terminal 330 through the management server 340.

Figure 15:
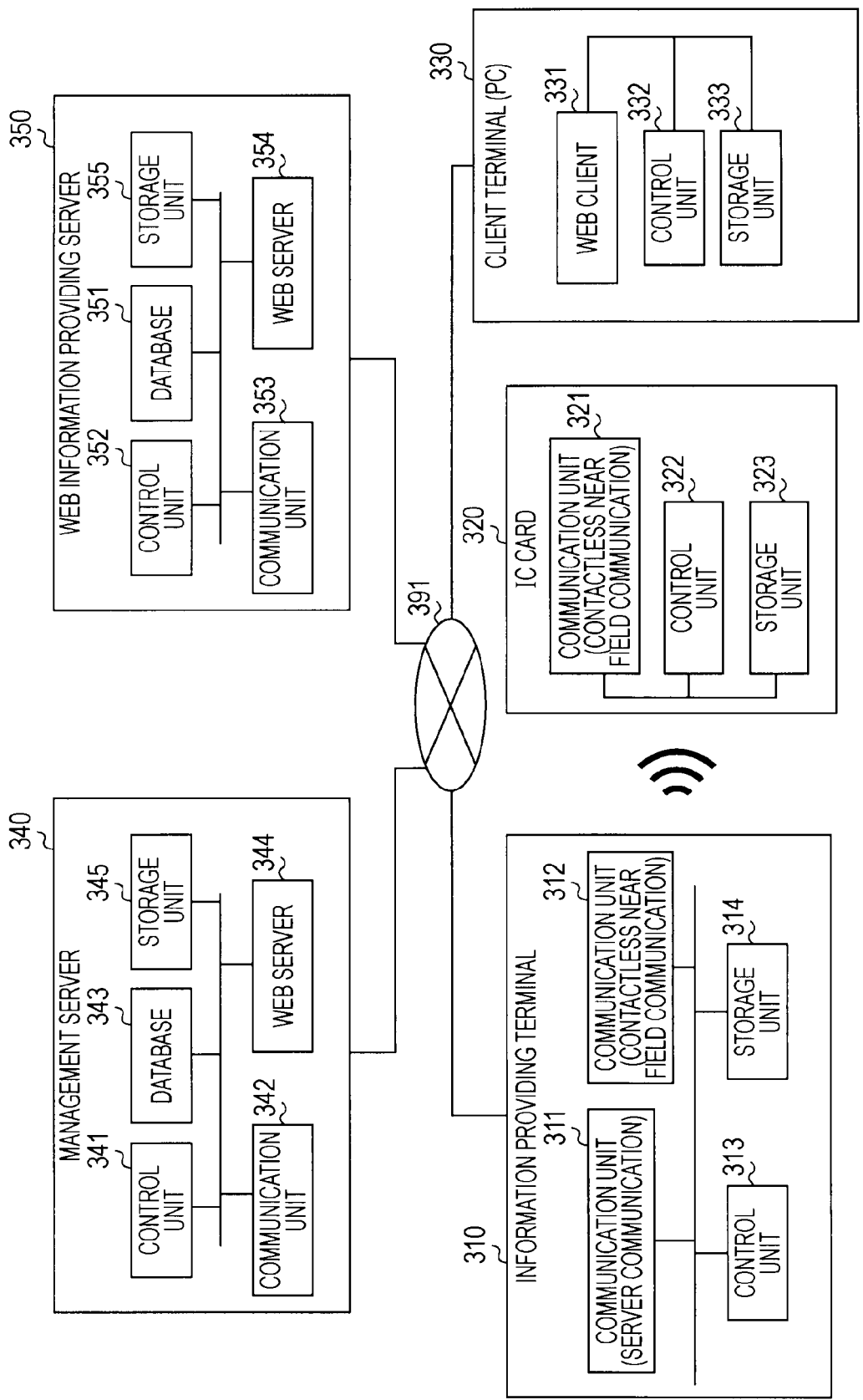
FIG. 15 is a diagram explaining exemplary constructions of components constituting the information providing system according to the third embodiment.

Exemplary constructions of the information providing terminal 310, the IC card 320, the client terminal 330, the management server 340, and the Web information providing server 350 in accordance with the third embodiment of the present invention will be described with reference to FIG. 15.

Information Providing Terminal 310

The information providing terminal 310 has the same construction as that of the information providing terminal 110 in the first embodiment. The information providing terminal 310 includes a communication unit 311, a communication unit 312, a control unit 313, and a storage unit 314. The communication unit 311 communicates with the management server 340 via a network 391. The communication unit 312 performs contactless near field communication with the IC card 320. The control unit 313 controls communication and also controls data input and output. The storage unit 314 records data to be output to the IC card 320 and the management server 340, data, such as card ID, input from the IC card 320, and a processing program.

IC Card 320

The IC card 320 has the same construction as that of the IC card 120 in the first embodiment. The IC card 320 includes a communication unit 321, a control unit 322, and a storage unit 323. The communication unit 321 performs contactless near field communication with the information providing terminal 310. The control unit 322 controls communication and also controls data acquisition from the storage unit 323 and data storage into the storage unit 323. The storage unit 323 records data input from the information providing terminal 310, the card ID, and a processing program.

Client Terminal 330

The client terminal 330 has the same construction as that of the client terminal 230 in the second embodiment and has no communication unit for performing contactless near field communication with the IC card 320. In the present embodiment, the client terminal 330 includes a Web client 331, a control unit 332, and a storage unit 333. The Web client 331 serves as a program for viewing information provided by the management server 340 and information provided by the Web information providing server 350 via the network 391. The control unit 332 controls communication and also controls data acquisition from the storage unit 333 and data storage into the storage unit 333. The storage unit 333 records information provided by the management server 340, information provided by the Web information providing server 350, and a processing program. The Web client 331 performs merging of information provided by the management server 340 and that provided by the Web information providing server 350.

Management Server 340

The management server 340 includes a control unit 341, a communication unit 342, a database 343, a Web server 344, and a storage unit 345. The control unit 341 controls communication with the information providing terminal 310, that with the Web information providing server 350, and that with the client terminal 330, and also controls access to the database 343. The communication unit 342 communicates with the information providing terminal 310, the Web information providing server 350, and the client terminal 330. The database 343 stores information received from the information providing terminal 310 and information to be provided to the client terminal 330. The Web server 344 generates information to be provided to the client terminal 330. The storage unit 345 stores various processing programs. Information stored in the database 343 is similar to that stored in the database shown in FIG. 10 described as a database example in the information providing server in the second embodiment.

Web Information Providing Server 350

The Web information providing server 350 includes a database 351, a control unit 352, a communication unit 353, a Web server 354, and a storage unit 355. The database 351 stores information provided to the client terminal 330. The control unit 352 controls communication with the management server 340 and that with the client terminal 330 and also controls access to the database 351. The communication unit 353 communicates with the management server 340 and the client terminal 330. The Web server 354 creates a Web page to be provided to the client terminal 330 and provides the Web page to the client terminal 330. The storage unit 355 stores various processing programs.

A processing sequence in the present embodiment will now be described with reference to FIG. 16. FIG. 16 illustrates a client terminal, an IC card, an information providing terminal, the management server, and the Web information providing server arranged in that order from the left. Steps S501 to S505 are carried out when a user having the IC card brings the IC card close to (or over) the information providing terminal installed in town, such as a public space. Steps S506 to S511 are carried out when the user having the IC card operates the client terminal to access the servers at, for example, the user's home in which the client terminal is installed.

It is assumed that step S401 in FIG. 13 has been performed as advanced processing prior to step S501 in this sequence diagram. In other words, it is assumed that the management server has performed setting of link between the client terminal and the IC card in the same way as that described with reference to FIG. 8 and has stored ID-associated management information in the database, the ID-associated management information containing the login IDs and passwords assigned to client terminals and the IDs of IC cards such that each IC card ID is associated with the login ID and password of the corresponding client terminal as described with reference to FIG. 9.

First, steps S501 to S505 will be described. In step S501, the user having the IC card brings the IC card close to (or over) the information providing terminal installed in town, such as a public space, or touches the IC card to the information providing terminal. In step S502, the IC card ID stored in a memory included in the IC card is input to the information providing terminal and is then stored into a storage unit included in the information providing terminal. In step S503, the information providing terminal writes information, such as product information, into the IC card.

In step S504, the information providing terminal transmits the IC card ID acquired from the IC card and the information (or the ID of the information), output to the IC card, to the management server. In this case, the information providing terminal may further transmit information (or the ID of the information), related to the information output to the IC card, to the management server.

In step S505, the management server registers the data received from the information providing server into the database. Consequently, the database stores, for example, the data described above with reference to FIG. 10.

Subsequently, steps S506 to S511 will be described. Those steps are carried out when the user having the IC card operates the client terminal to access the servers at the user's home in which the client terminal is installed.

In step S506, the client terminal performs login to a portal site provided by the Web information providing server. It is assumed that the client terminal has created the portal site for exclusive use with the client terminal in a Web page provided by the Web information providing server and has set login information, such as login ID and password, for access, or Web page viewing. The user views the portal site for the client terminal by inputting the registered login information (the login ID and the password in this embodiment).

When receiving the login information (the login ID and the password) as a request for viewing the portal site from the client terminal, the Web information providing server provides, for example, a page for exclusive use with the client terminal to the client terminal in step S507. The provided information is the Web page (A) provided by the Web information providing server which has been described with reference to FIG. 14.

In step S508, the client terminal transmits a written information request to the management server. In this step, the client terminal inputs the login information, such as the login ID and password, registered in the management server. The management server acquires written information ID associated with the login information (the login ID and the password) from the ID-associated management information 181 in the database described with reference to FIG. 10 and acquires written information specified by the written information ID. In step S509, the management server provides the written information to the client terminal. The provided information is, for example, the written information (B) provided by the management server described with reference to FIG. 14.

In step S510, the client terminal merges the written information provided by the management server into the Web page provided by the Web information providing server. In step S511, the client terminal displays the resultant information containing the information items provided by the two different servers. The concrete example of merging has been described above with reference to FIG. 14.

In the present embodiment, although the client terminal has no card reader and does not directly read out information stored in the IC card and display the read-out information, the user can view information stored in the IC card and information related to the stored information on the client terminal through the management server.

In the present embodiment, written information is merged into a Web page provided by the Web information providing server. For example, a Web page provided by the Web information providing server is a site for exclusive use with the client terminal by the user. On this site, information about the titles of pieces of music the user has purchased is recorded. Information about the title of a piece of music or an album newly acquired as written information through the IC card is merged into the site and the resultant site is displayed, so that the user can refer to the information about the pieces of music the user has purchased while comparing with the written information.

In the present embodiment, provided information is output from the information providing terminal 310 to the IC card 320 and is then stored into the storage unit in the IC card 320 in the same way as the first and second embodiments. When the system is constructed such that the client terminal 330 obtains all of information items from the management server 340, output of provided information from the information providing terminal 310 to the IC card 320 and storage of the information into the IC card 320 may be omitted.

As described above, the IC card 320 is not limited to a card-type IC card and may include a mobile phone having an IC card function or an information processing apparatus, such as a portable terminal or a PC.

In the above-described first to third embodiments, the information providing terminal may hold provided information to be provided to IC cards. The management server may hold provided information and allow the information providing terminal to display the provided information. For example, assuming that the information providing terminal is a Web browser and the management server is a Web server, the information providing terminal displays, for example, HTML screen information transmitted from the management server (Web server) and writes information into an IC card as necessary.

The present invention has been described in detail with reference to the specific embodiments. However, it is obvious that those skilled in the art can make modifications and/or substitutions of the embodiments without departing from the scope and spirit of the present invention. That is, the embodiments have been described for illustrative purpose only, and the contents of the specification should not be interpreted restrictively. To understand the scope of the present invention, the appended claims should be taken into consideration.

The series of processing steps explained in this specification can be executed by hardware, software, or a combination thereof. When the series of processing steps is executed by software, a program including a processing sequence may be installed into a memory in a computer incorporated in dedicated hardware and be executed. Alternatively, the program may be installed into a multi-purpose computer capable of executing various processes and be executed. For example, the program may be prestored on a recording medium. The program may be installed from the recording medium to the computer. Alternatively, the computer may receive the program via a network, such as a local area network (LAN) or the Internet, and install the program into a recording medium, such as a built-in hard disk.

The various processes described in this specification may be performed not only in a time-series manner as described herein but also in parallel or separately in accordance with the processing performance of an apparatus, which executes the processes, or as necessary. The term "system" in this specification is a logical set of devices and the devices each serving as a component are not necessarily accommodated in a single casing.

What is claimed is:

1. An information processing apparatus for performing a process of providing information to an integrated circuit (IC) card, the apparatus comprising:
   a communication unit configured to perform contactless near field communication to read out a card identification (ID) of the IC card and provide one of a plurality of information sets to the IC card; and
   a control unit configured to transmit to a management server the card ID supplied through the communication unit and, in response to transmitting the card ID to the management server, receive a reply from the management server indicating the one of the information sets to be provided to the IC card.

2. The apparatus according to claim 1, wherein the IC card is an information processing apparatus having an IC card function.

* * * * *